US008196957B2

(12) United States Patent
Kubo et al.

(10) Patent No.: US 8,196,957 B2
(45) Date of Patent: Jun. 12, 2012

(54) AIRBAG AND AIRBAG DEVICE

(75) Inventors: Yoshiyuki Kubo, Tokyo (JP); Tsutomu Teramura, Tokyo (JP); Tatsuya Maruyama, Tokyo (JP); Masafumi Ueda, Tokyo (JP)

(73) Assignee: Takata Corporation, Tokyo (JP)

( * ) Notice: Subject to any disclaimer, the term of this patent is extended or adjusted under 35 U.S.C. 154(b) by 245 days.

(21) Appl. No.: 12/591,854

(22) Filed: Dec. 3, 2009

(65) Prior Publication Data
US 2010/0156074 A1 Jun. 24, 2010

(30) Foreign Application Priority Data

Dec. 24, 2008 (JP) ................................ 2008-327977

(51) Int. Cl.
B60R 21/16 (2006.01)

(52) U.S. Cl. .................................................... 280/743.2
(58) Field of Classification Search ................ 280/743.2, 280/743.1
See application file for complete search history.

(56) References Cited

U.S. PATENT DOCUMENTS

| 5,308,113 | A | * | 5/1994 | Moriset | 280/743.2 |
| 5,362,101 | A | * | 11/1994 | Sugiura et al. | 280/743.2 |
| 5,568,938 | A | * | 10/1996 | Lindstrom | 280/743.2 |
| 5,613,708 | A | * | 3/1997 | Bleider et al. | 280/743.2 |
| 5,813,696 | A |   | 9/1998 | Hill |  |
| 2002/0158456 | A1 | * | 10/2002 | Fischer | 280/743.2 |

FOREIGN PATENT DOCUMENTS

| JP | H07-277124 | 10/1995 |
| JP | 3003182 | 11/1999 |
| JP | 2001-233157 | 8/2001 |
| JP | 2003-300446 | 10/2003 |

\* cited by examiner

Primary Examiner — Eric Culbreth
(74) Attorney, Agent, or Firm — Manabu Kanesaka

(57) ABSTRACT

An airbag for protecting an occupant includes a panel forming the airbag and having an occupant counter surface with a head counter portion to face a head of the occupant when the airbag is inflated. A recess portion is formed in the head counter portion when the airbag is inflated. The airbag also includes a regulation member for regulating inflation of the head counter portion toward the occupant. The regulation member forms the recess portion by regulating inflation of the head counter portion toward the occupant upon inflation of the airbag. The regulation member is configured to release regulation after a predetermined time from a moment when the airbag starts inflation.

17 Claims, 21 Drawing Sheets

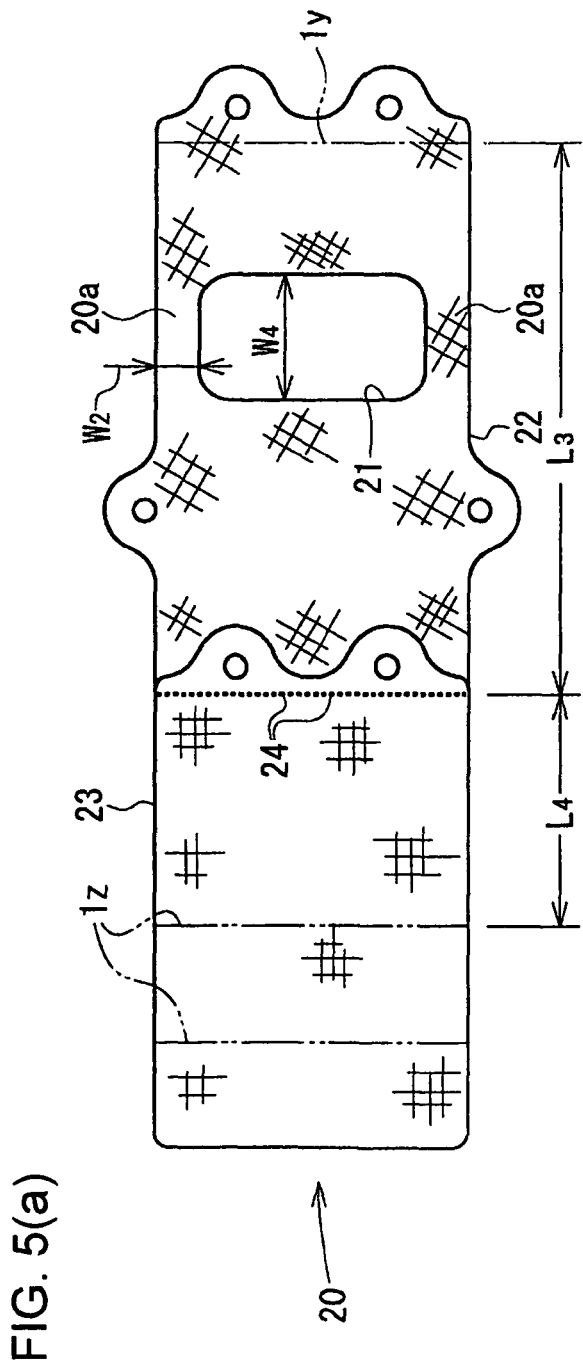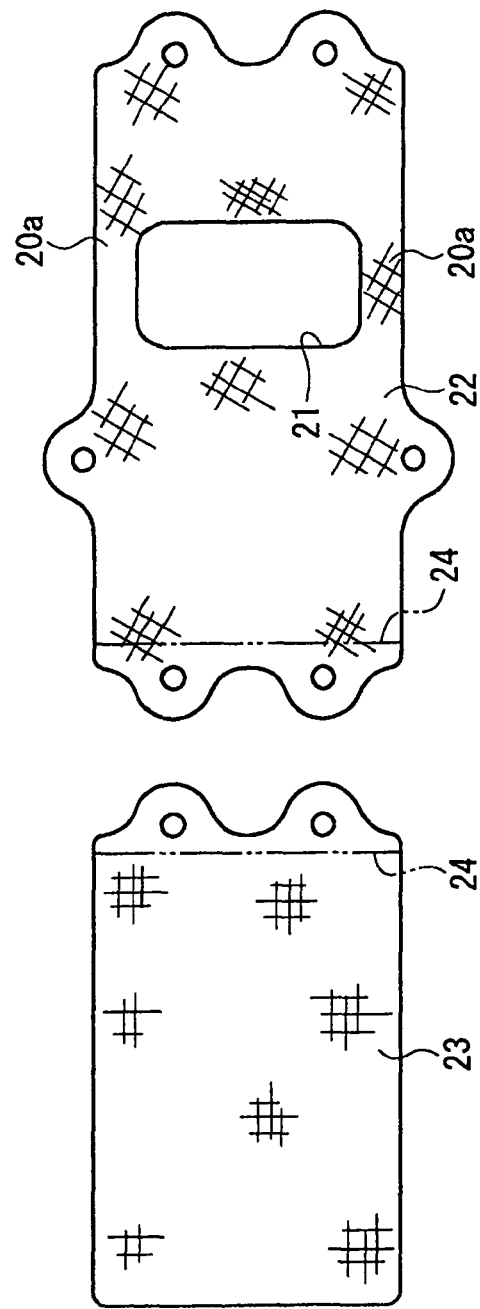
FIG. 5(a)
FIG. 5(b)

FIG. 9(a)
FIG. 9(b)
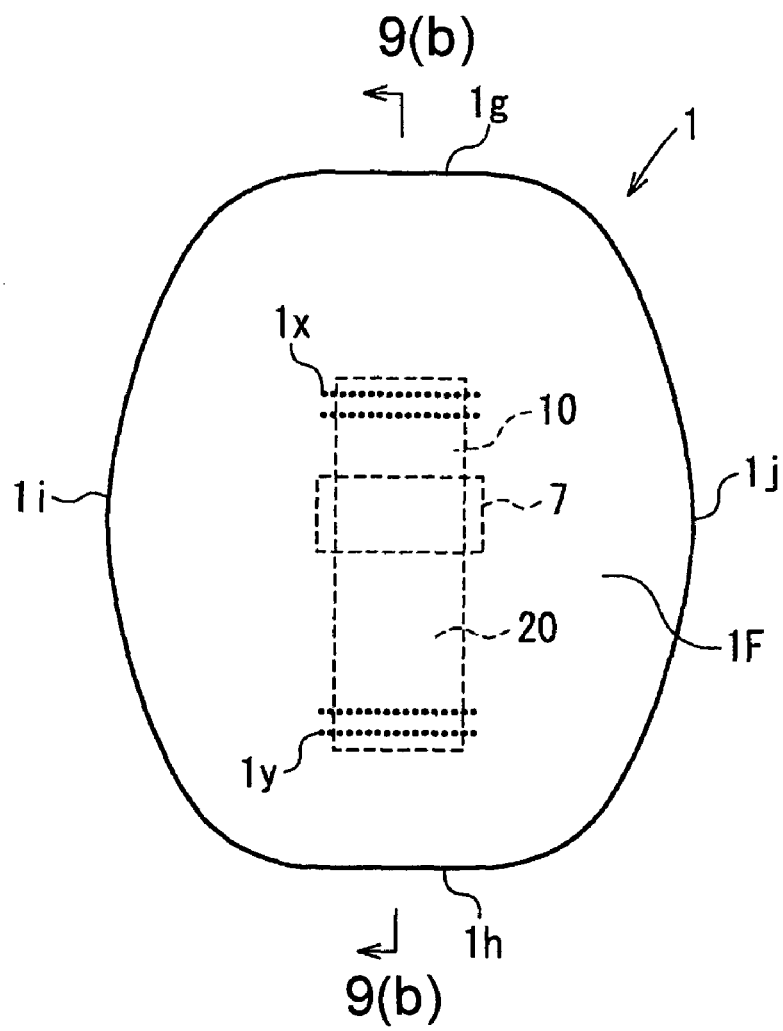
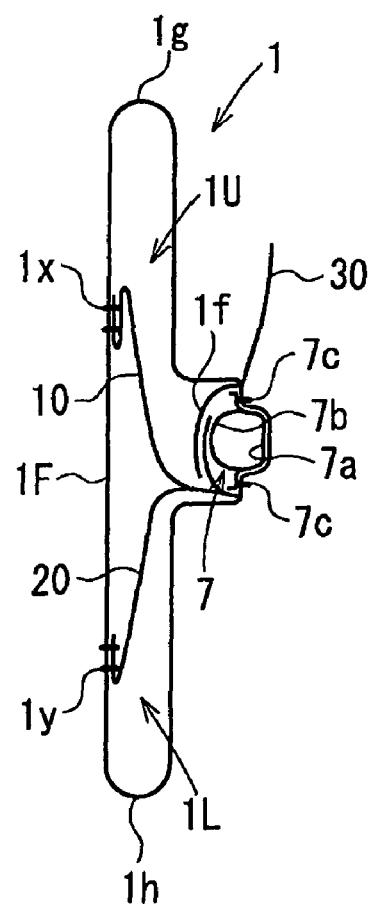

AIRBAG AND AIRBAG DEVICE

BACKGROUND OF THE INVENTION AND RELATED ART STATEMENT

The present invention relates to an airbag having a recess portion formed in a head counter portion of an occupant counter surface of the airbag from the occupant side, which confronts the occupant head upon inflation of the airbag. Specifically, the present invention relates to an airbag provided with a regulation member for regulating inflation of the head counter portion toward the occupant. Upon inflation of the airbag, the regulation member regulates inflation of the head counter portion toward the occupant to form the recess portion. The present invention further relates to an airbag device provided with the aforementioned airbag.

The present invention especially relates to an airbag and an airbag device adapted to the passenger seat of the vehicle.

In the specification, an AF05 dummy stands for a legally regulated crash test dummy in the U.S. for a small-sized adult female in 5 percentile. An AM50 dummy stands for a crash test dummy for a large-sized adult male in 50 percentile, which is larger than the female dummy.

In the specification, the small-sized occupant stands for the one with a physical size corresponding to the AF05 dummy. The large-sized occupant stands for the one with a physical size corresponding to the AM50 dummy.

FIG. 25 illustrates a structure of a generally employed passenger airbag.

A passenger airbag device 100 includes an airbag 101, a case 102 and an inflator 103. The airbag 101 is folded to be stored in the case 102, and is inflated by the inflator 103. The case 102 is a container with an opened upper surface which is covered with an instrument panel 104. A windshield 105 is disposed above the instrument panel 104.

Upon supplying gas from the inflator 103, the airbag 101 inflates from the upper surface of the instrument panel 104 to fill the space between the instrument panel 104 and the windshield 105, and the space to the front of the passenger seat. A surface of the inflated airbag 101 to the rear of the vehicle becomes an occupant counter surface 101F opposite an occupant seated on the passenger seat.

In most of the cases, the small-sized occupant will be seated by sliding the seat forward from the backward limit, and the large-sized occupant will be seated without sliding the seat forward.

Generally, the airbag 101 has a sufficient capacity to allow the occupant counter surface 101F to come close to the occupant head upon completion of the inflation even if the occupant is seated without sliding the seat forward.

In the case where the occupant is seated while sliding the seat forward, the occupant counter surface 101F during inflation toward the occupant side may be brought into contact with the occupant head as illustrated in FIG. 25. In such a case, there may be a risk of strong contact between the occupant head and the occupant counter surface 101F.

Japanese Unexamined Patent Application Publication No. 2001-233157 discloses the airbag structured to form a recess portion at a position of the occupant counter surface of the airbag, which is expected to confront the occupant head upon inflation of the airbag. The aforementioned airbag is structured such that the deepest portion of the recess portion is positioned below the occupant chin upon inflation of the airbag, and the tilted surface above the deepest portion of the recess portion confronts the occupant head (face surface).

Upon inflation of the airbag, the tilted surface above the deepest portion of the recess portion is overhung to be positioned rearward of the vehicle as it becomes close to the upper portion of the airbag. In any of the cases where the small-sized occupant is seated by sliding the seat forward, and the large-sized occupant is seated without sliding the seat forward, the tilted surface above the deepest portion of the recess portion may be kept apart from the occupant head by approximately the same distance in both cases during inflation of the airbag.

This makes it possible to prevent strong contact between the head of the small-sized occupant who is seated by sliding the seat forward and the occupant counter surface of the inflating airbag.

In the related art as described above, a lifting cord is provided in the airbag for linking the occupant counter surface of the airbag to the side opposite the occupant. The lifting cord partially pulls the occupant counter surface in the airbag to form the recess portion in the occupant counter surface.

Patent Document 1: Japanese Unexamined Patent Application Publication No. 2001-233157

In Japanese Unexamined Patent Application Publication No. 2001-233157, the distance between the occupant counter surface of the inflating airbag and the occupant head is increased when the small-sized occupant is seated without sliding the seat forward.

Generally, the windshield is tilted rearward of the vehicle body as it is closer to the upper end side as shown in FIG. 25. The inflating airbag has the shape having the thickness in the longitudinal direction of the vehicle body smaller as it is closer to the upper portion along the tilted surface of the windshield. The use of the lifting cord to regulate the inflation of the occupant counter surface toward the occupant may cause the risk of insufficient thickness of the inflated airbag in the longitudinal direction of the vehicle body at the upper end side.

Accordingly, an object of the present invention is to provide an airbag capable of effectively restricting the head of the occupant who is seated by sliding the seat forward and the occupant who is seated without sliding the seat forward, and an airbag device provided with the airbag.

Further objects and advantages of the invention will be apparent from the following description of the invention.

SUMMARY OF THE INVENTION

An airbag according to the first aspect of the present invention is structured to have a recess portion formed in a head counter portion of an occupant counter surface of the airbag at a side of the occupant, which confronts a head of the occupant. The airbag which includes a regulation member for regulating inflation of the head counter portion toward the occupant is structured to form the recess portion by allowing the regulation member to regulate the inflation of the head counter portion toward the occupant upon inflation of the airbag. The regulation member is structured to release regulation after an elapse of a predetermined time from a moment when the airbag starts inflating.

In the airbag of the second aspect, according to the first aspect, the predetermined time is in a range from 15 to 40 msec from the moment when the airbag starts inflating.

In the airbag of the third aspect, according to the first or second aspect, the regulation member is disposed inside the airbag, and connects the head counter portion to the inflated airbag at a side opposite the occupant. The regulation member is structured to be ruptured by a tensile force applied to the regulation member after the elapse of the predetermined time period from the moment when the airbag starts inflating to release the connection between the head counter portion and the side opposite the occupant.

In the airbag of the fourth aspect, according to the third aspect, a fragile portion is formed in the regulation member so as to be ruptured upon application of the tensile force to the regulation member. The fragile portion is located apart from an end of the regulation member at a side opposite the occupant by 210 to 240 mm upon the inflation of the airbag.

In the airbag of the fifth aspect, according to the forth aspect, an opening is formed in the regulation member, and a circumferential edge of the opening serves as the fragile portion.

In the airbag of the sixth aspect, according to the fourth or fifth aspect, the regulation member is formed of a woven cloth having a weaving structure obliquely crossing with respect to the tensile direction at least in the fragile portion of the regulation member.

In the airbag of the seventh aspect, according to the sixth aspect, the weaving direction of the woven cloth is substantially in parallel with the tensile direction at least in an end of the regulation member at the side opposite the occupant upon inflation of the airbag and a surrounding portion.

In the airbag of the eighth aspect, according to any one of the first to seventh aspects, a sub-regulation member is provided in the airbag for connecting a lower portion of the occupant counter surface to the side opposite the occupant upon inflation of the airbag. The sub-regulation member is structured to be ruptured before releasing the regulation member from a moment when the airbag starts inflating so as to release the connection between the lower portion of the occupant counter surface and the side opposite the occupant.

In the airbag of the ninth aspect, the sub-regulation member is structured to be ruptured after an elapse of 10 to 30 msec from the moment when the airbag starts inflating.

In the airbag of the tenth aspect, according to the eight or ninth aspect, the fragile portion is formed in the sub-regulation member. It is structured to rupture the sub-regulation member at the fragile portion by the tensile force applied to the sub-regulation member before releasing the regulation of the regulation member from the moment when the airbag starts inflating. The fragile portion of the sub-regulation member is located apart from an end of the sub-regulation member at the side opposite the occupant upon inflation of the airbag in a range from 190 to 220 mm.

In the airbag of the eleventh aspect, according to the tenth aspect, an opening is formed in the sub-regulation member, and a circumferential edge portion of the opening is formed as the fragile portion.

In the airbag of the twelfth aspect, according to the tenth or eleventh aspect, the subregulation member is formed of a woven cloth having a weaving structure obliquely crossing with respect to the tensile direction at least in the fragile portion of the regulation member.

In the airbag of the thirteenth aspect, according to the twelfth aspect, the weaving direction of the woven cloth is substantially in parallel with the tensile direction at least in an end of the subregulation member at the side opposite the occupant upon inflation of the airbag and a surrounding portion.

An airbag device of the present invention according to the fourteenth aspect includes the airbag as described in any one of the first to thirteenth aspects and an inflator for inflating the airbag.

In the airbag of the present invention (the first aspect) and the airbag device of the present invention (the fourteenth aspect), the regulation member regulates the inflation of the head counter portion of the occupant counter surface of the airbag, which confronts the occupant head upon inflation of the airbag toward the occupant for the period from start of the inflation until an elapse of a predetermined time. In the case where the occupant is seated by sliding the seat forward, and the airbag is brought into contact with the occupant head before the elapse of the predetermined time from the start of the airbag inflation, the regulation member regulates the inflation of the head counter portion toward the occupant. This makes it possible to prevent the strong contact of the airbag with the occupant head. At this moment, the regulation member reduces the capacity of the airbag so that the inner pressure of the airbag is smoothly boosted to sufficiently protect the occupant head.

Upon the elapse of the predetermined time from start of the airbag inflation, the regulating operation of the regulation member is released to allow the head counter portion of the airbag to sufficiently inflate toward the occupant. In the case where the occupant is seated without sliding the seat forward, the occupant head may be protected by the airbag before the head moves forward excessively. The thickness of the inflated airbag at the upper portion in the longitudinal direction of the vehicle body may be sufficiently large, thus sufficiently restricting the forward movement of the occupant head.

In the present invention, it is preferable to form the regulation member to regulate inflation of the head counter portion of the occupant counter surface of the inflating airbag, which confronts the head of the small-sized occupant toward the occupant side. Even if the small-sized occupant is seated by sliding the seat forward, the aforementioned structure regulates inflation of the head counter portion which confronts the head of the small-sized occupant upon inflation of the airbag toward the occupant side. This makes it possible to prevent the strong contact of the airbag with the occupant head, and to further prevent the head from being compressed by the upper portion of the airbag which moves to the upper side of the head of the small-sized occupant.

In the case where the occupant is seated without sliding the seat forward, upon the elapse of the predetermined time from start of the airbag inflation, the regulating operation of the regulation member is released, thus allowing the head counter portion to sufficiently inflate toward the occupant side. The occupant head may be protected by the airbag before excessively moving forward. As the thickness of the upper portion of the inflating airbag in the longitudinal direction of the vehicle body becomes sufficiently large, the head of the large-sized heavy occupant may be sufficiently protected.

In the present invention according to the second aspect, it is preferable to form the regulation member to release the regulating operation after the elapse of 15 to 40 msec (milliseconds) from the start of the airbag inflation.

According to the third aspect, the regulation member may be simply structured.

According to the fourth aspect, the fragile portion of the regulation member is spaced apart from the end portion of the regulation member at the side opposite the occupant upon the airbag inflation by 210 to 240 mm so as to be insusceptible to the influence of the heat of the gas blown from the inflator.

According to the fifth aspect, the opening formed in the regulation member allows the regulation member to have the fragile portion easily formed. The opening is spaced apart from the end of the regulation member at the side opposite the occupant such that the gas blown from the inflator is guided to the regulation member. The gas is then likely to flow toward the occupant side, which allows the airbag to inflate smoothly toward the occupant side.

According to the sixth aspect, the regulation member is formed of a woven cloth. The weaving direction of the woven cloth is obliquely crossed with respect to the tensile direction of the regulation member. The regulation member is obtained by cutting the woven cloth with the warp and woof along both sides of the regulation member at least at the fragile portion. If the predetermined tensile force or higher is applied to the regulation member, the warp and woof of the woven cloth are respectively drawn out from the woven structure at the fragile portion, thus rupturing the regulation member.

Unlike the regulation member which ruptures by cutting at least one of the warp and the woof of the woven cloth, the above-structured regulation member exhibits the rupture strength which is insusceptible to the influence of the heat from the inflator. This makes it possible to suppress fluctuation in the timing at which the regulation member ruptures.

According to the seventh aspect, the weaving direction of the woven cloth is substantially in parallel with the tensile direction at least at the end portion of the regulation member at the side opposite the occupant, and the surrounding area. The rupture strength around the aforementioned part is high so as to allow the regulation member to be solidly connected to the airbag at the side opposite the occupant.

According to the eighth aspect, a sub-regulation member is provided inside the airbag for connecting the lower portion of the occupant counter surface and the side opposite the occupant. This may prevent and suppress flopping of the lower portion of the airbag upon its inflation.

As described in the ninth aspect, the sub-regulation member is set to rupture after 10 to 30 msec from the start of the airbag inflation. Upon the airbag inflation, the lower side of the airbag may be sufficiently inflated to restrict the occupant before the occupant moves forward excessively. Even if the sub-regulation member ruptures, the inflation is regulated at the upper portion of the airbag by the regulation member. This makes it possible to allow the lower portion of the airbag to inflate promptly.

According to the tenth aspect, the sub-regulation member may be simply structured. In the embodiment, the fragile portion of the sub-regulation member is spaced apart from the end portion of the sub-regulation member at the side opposite the occupant upon inflation of the airbag by 190 mm to 220 mm.

According to the eleventh aspect, the opening formed in the sub-regulation member allows the fragile portion to be easily formed in the sub-regulation member. As the opening is spaced apart from the end portion of the sub-restriction member at the side opposite the occupant, the gas blown from the inflator is guided to the sub-regulation member and likely to flow to the lower portion of the airbag, thus inflating the lower portion of the airbag promptly.

According to the twelfth aspect, the sub-regulation member is formed of the woven cloth having the weaving direction obliquely crossed with respect to the tensile direction of the sub-regulation member at least in the fragile portion. Likewise the regulation member according to the sixth aspect, the sub-regulation member has the rupture timing which is unlikely to fluctuate.

According to the thirteenth aspect, the weaving direction of the woven cloth is in substantially parallel with the tensile direction at least at the end portion of the sub-regulation member at the side opposite the occupant and a surrounding portion. The rupture strength of the aforementioned part is high sufficient to solidly connect the sub-regulation member to the airbag at the side opposite the occupant.

BRIEF DESCRIPTION OF THE DRAWINGS

FIG. 5(a) is a plan view of a lower regulation member, and FIG. 5(b) is an exploded perspective view of the lower regulation member.

FIGS. 9(a) and 9(b) are explanatory views showing a process for folding the airbag.

DETAILED DESCRIPTION OF PREFERRED EMBODIMENTS

Figure 1:
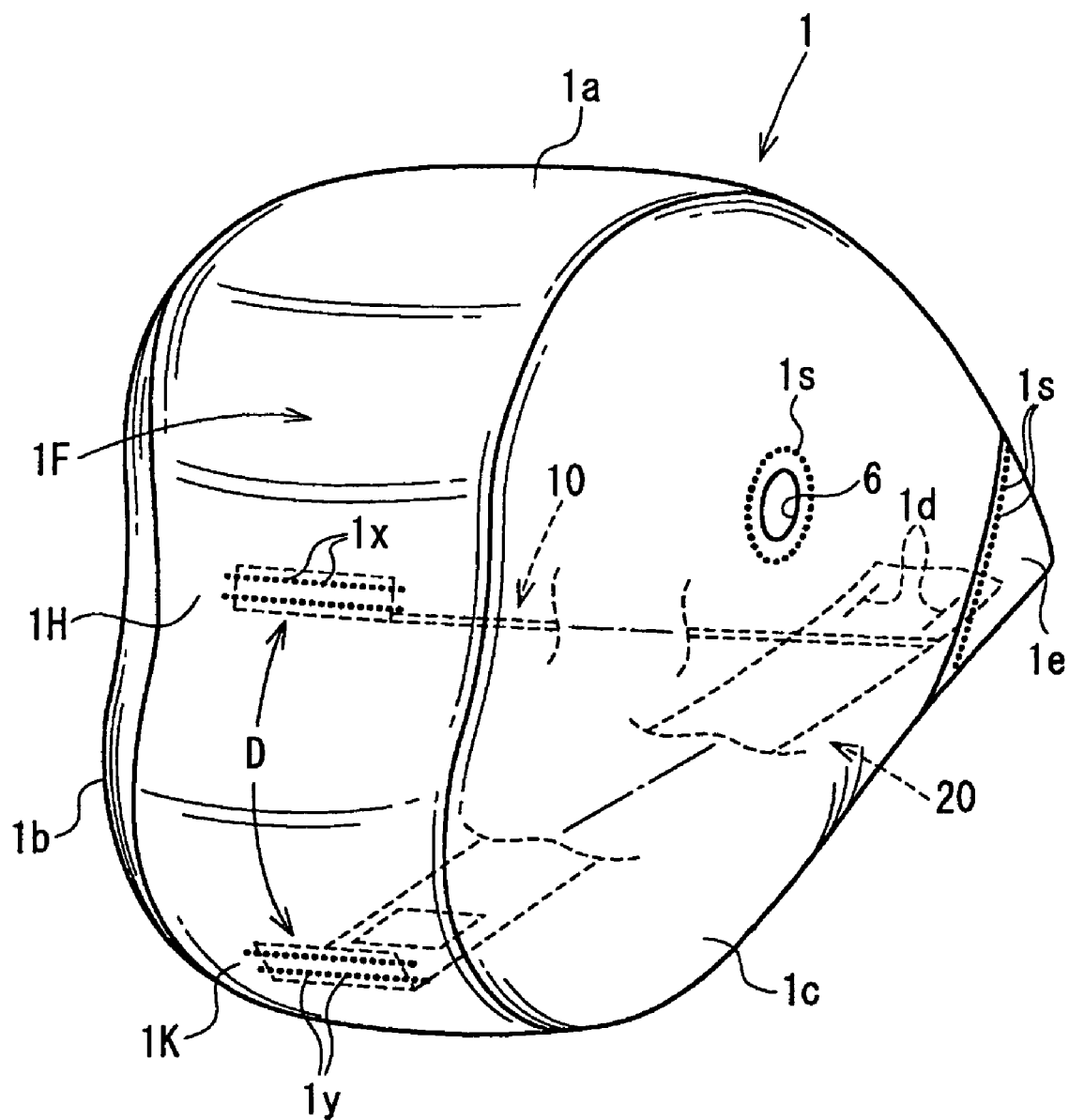
FIG. 1 is a perspective view of an airbag according to an embodiment in an inflated state.

The present invention will be further illustrated with examples below referring to the drawings.

Figure 2A:
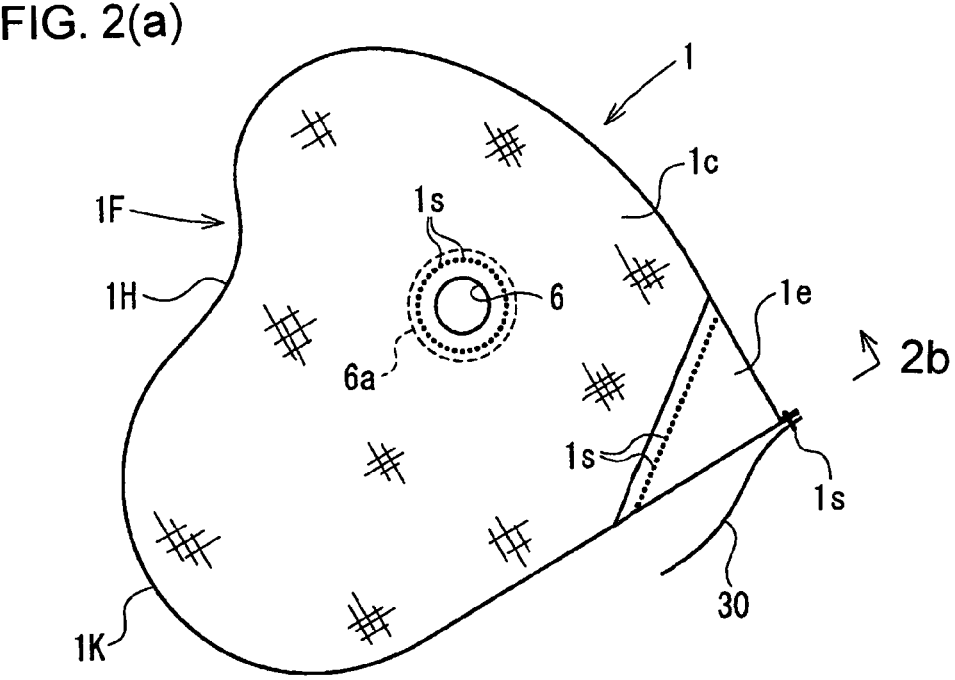
FIG. 2(a) is a side view of the airbag in the inflated state.
Figure 2B:
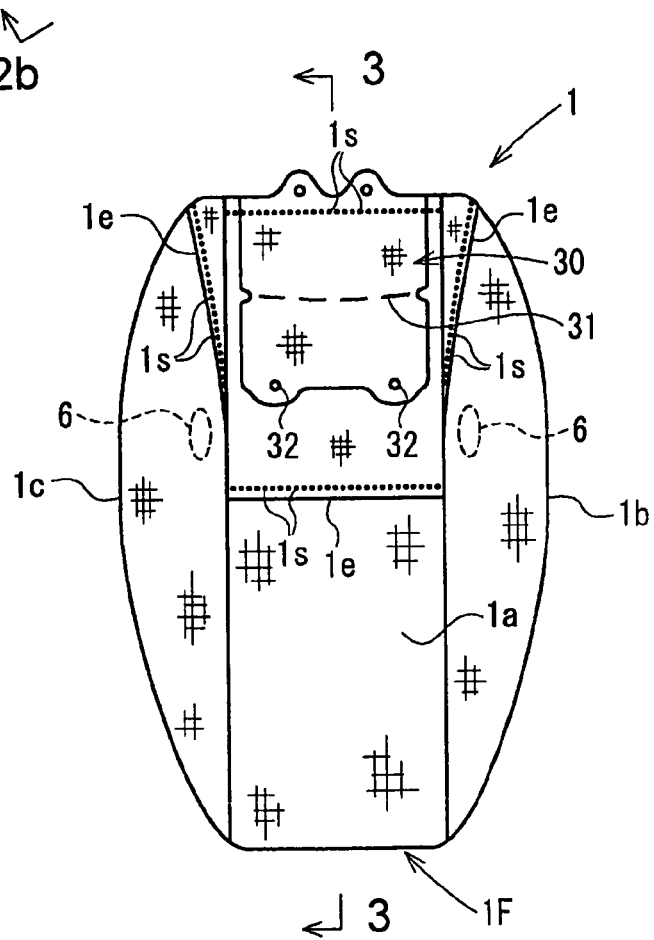
FIG. 2(b) is a view seen from line b-b of FIG. 2(a).
Figure 3:
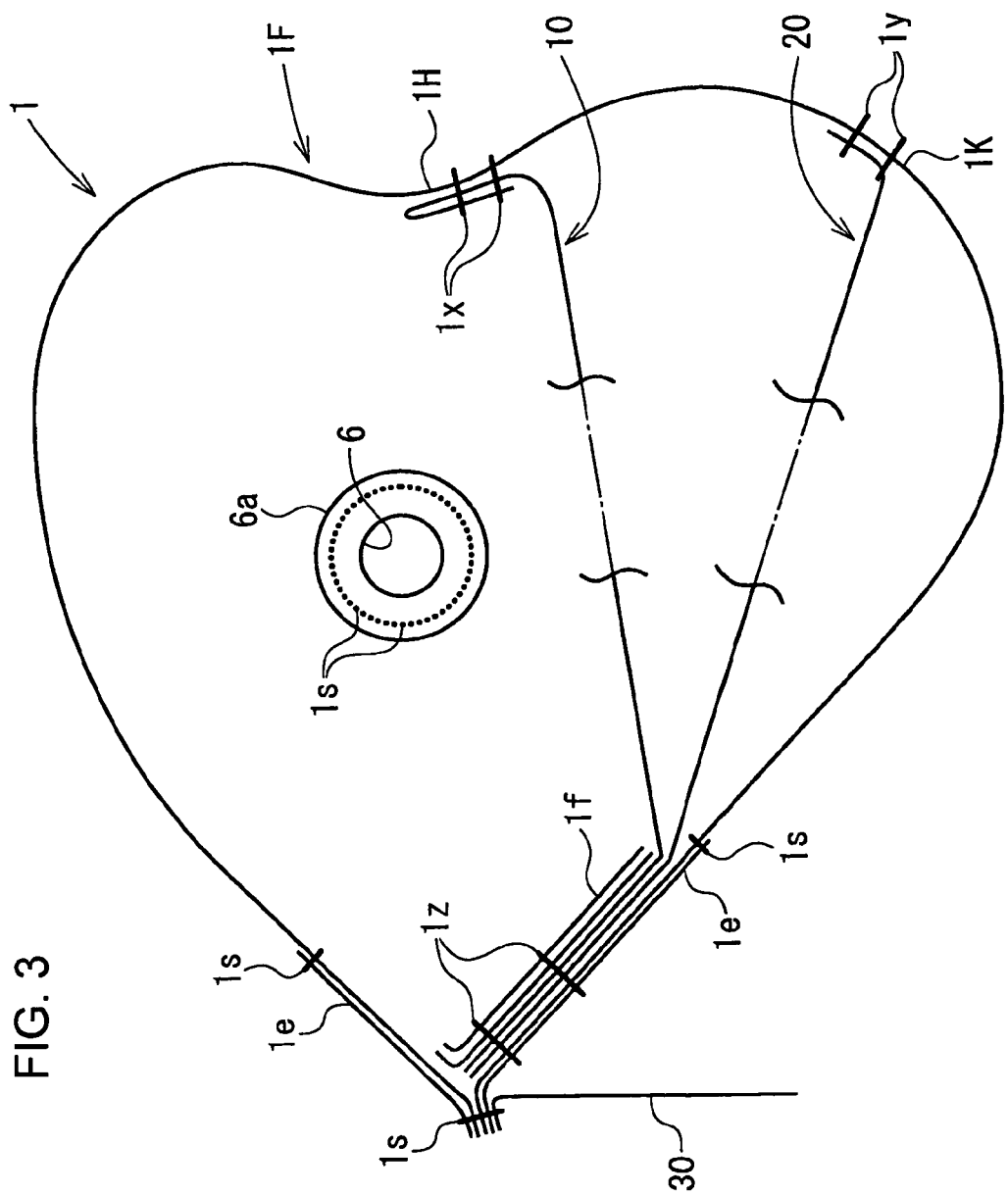
FIG. 3 is a sectional view taken along line 3-3 of FIG. 2(b).
Figure 4A:
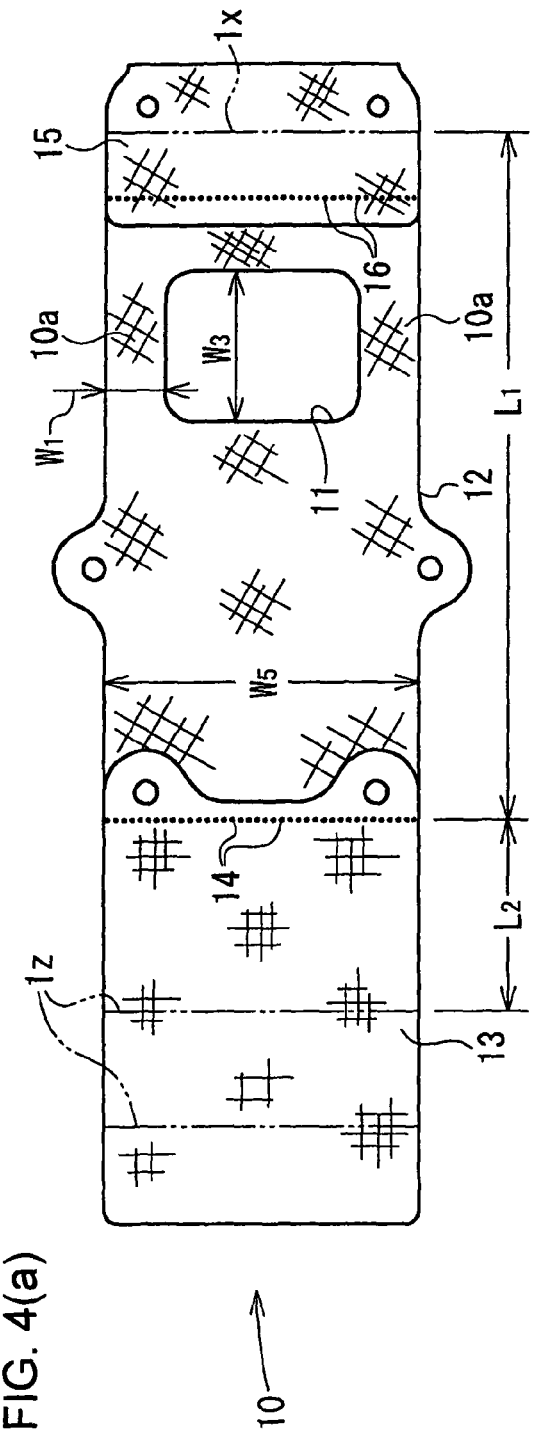
FIG. 4(a) is a plan view of an upper regulation member and FIG. 4(b) is an exploded plan view of the upper regulation member.
Figure 4B:
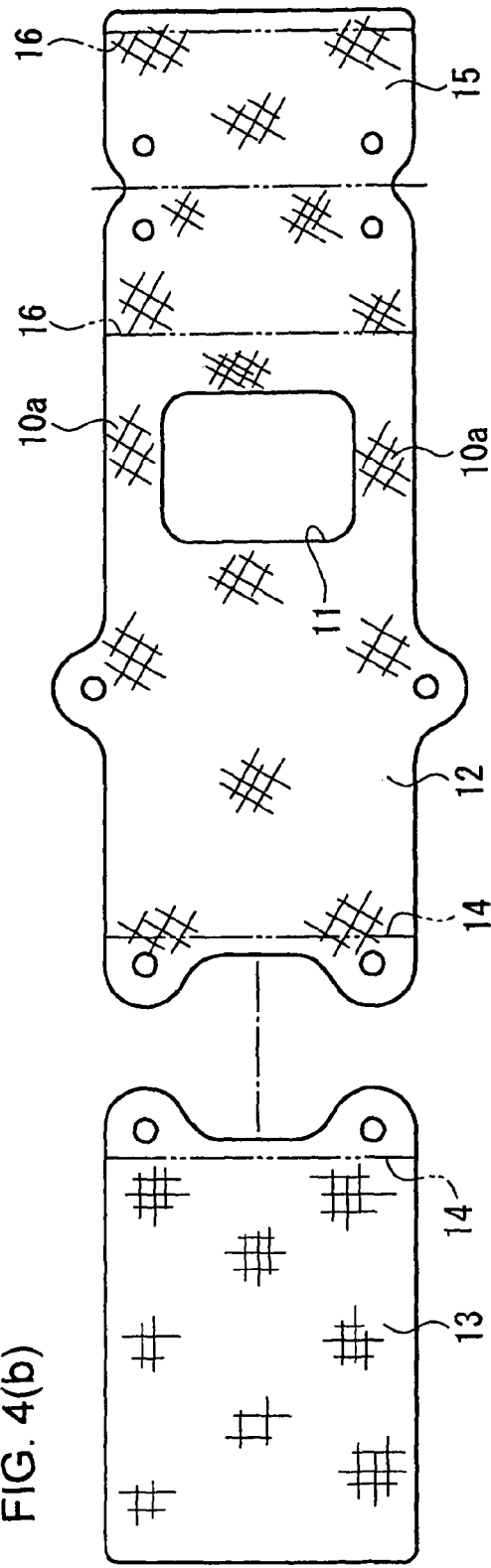
Figure 6:
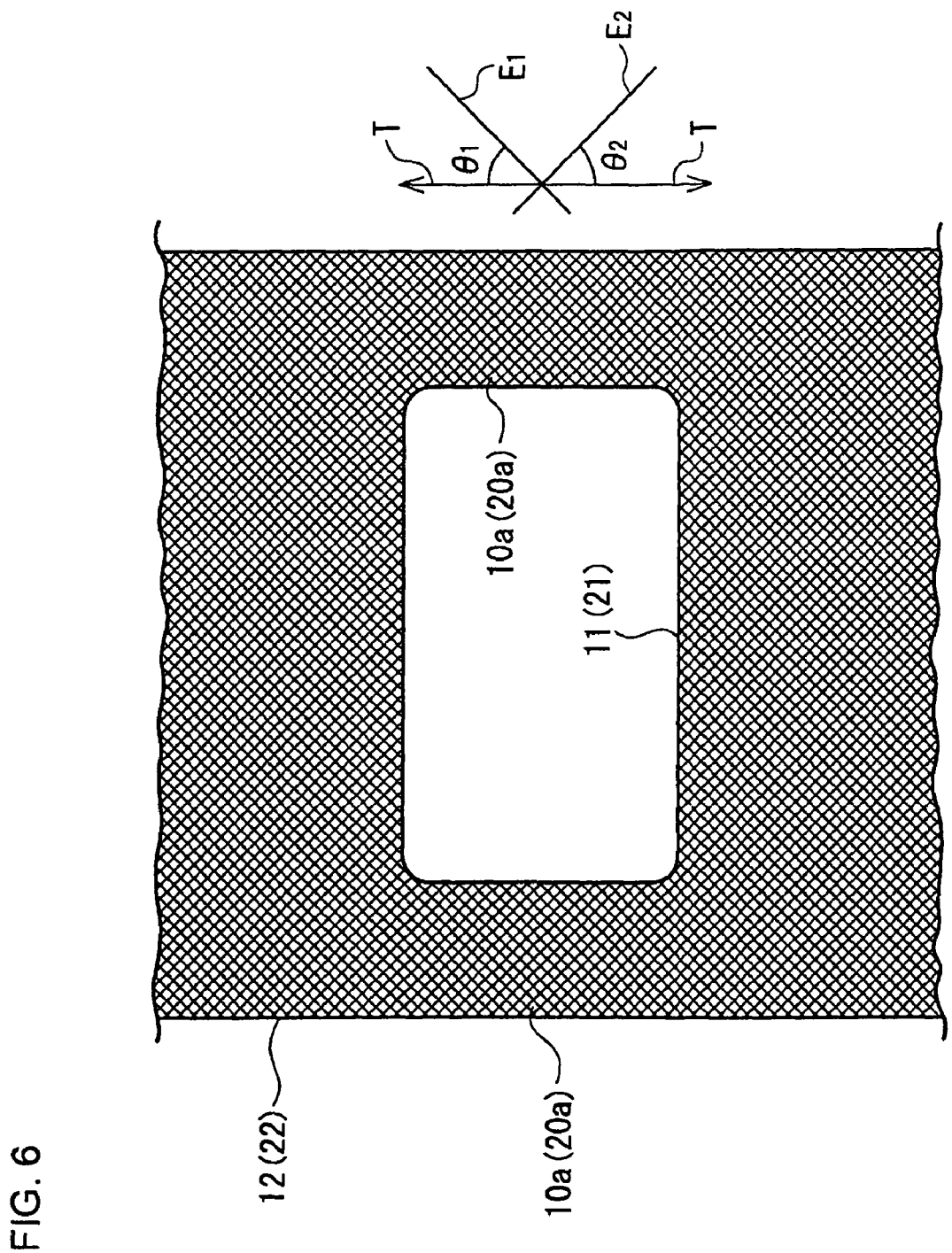
FIG. 6 is a plan view showing a portion around an opening of a regulation member.
Figure 7:
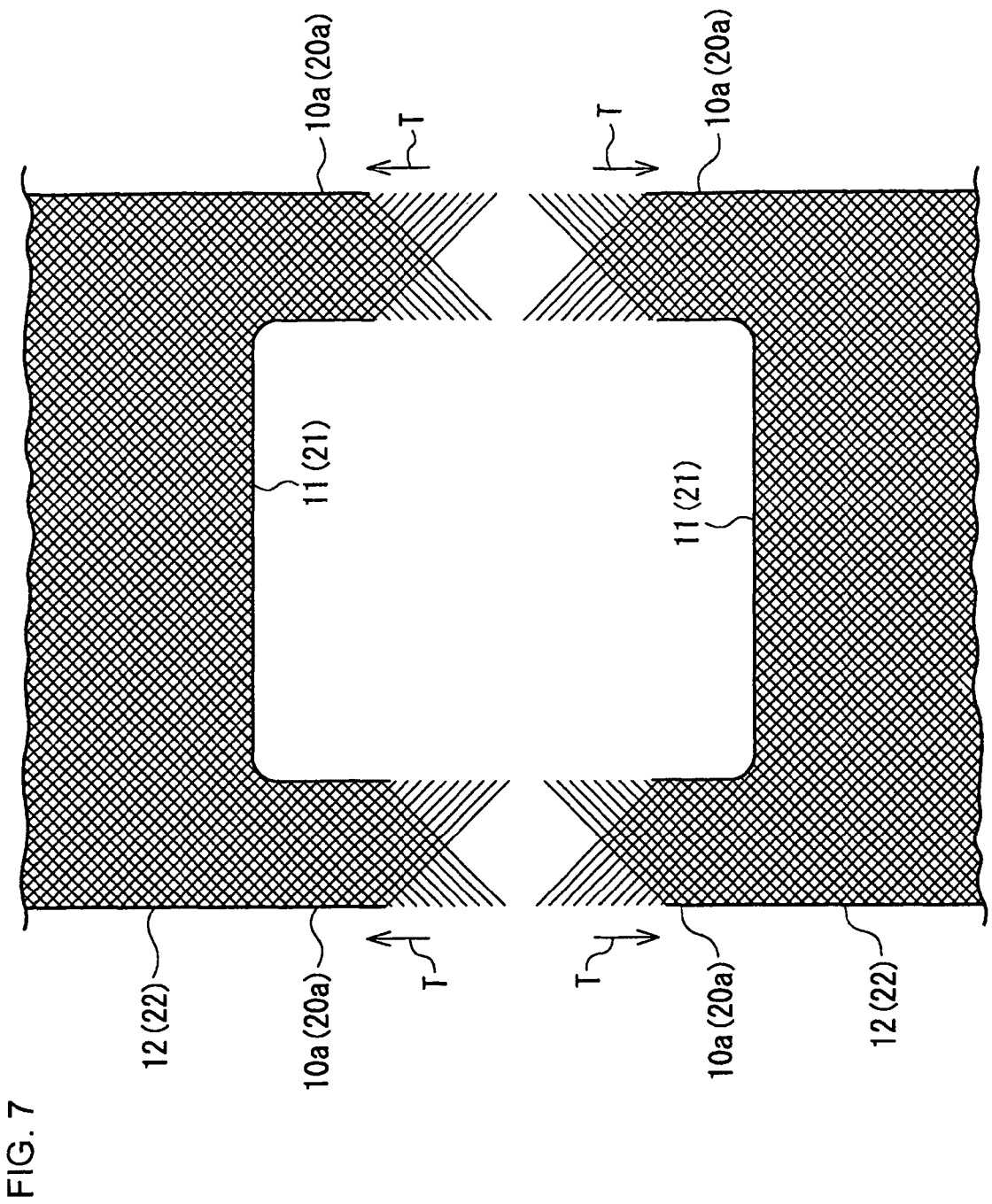
FIG. 7 is a plan view of the same portion as shown in FIG. 6 upon rupture of the regulation member.
Figure 8:
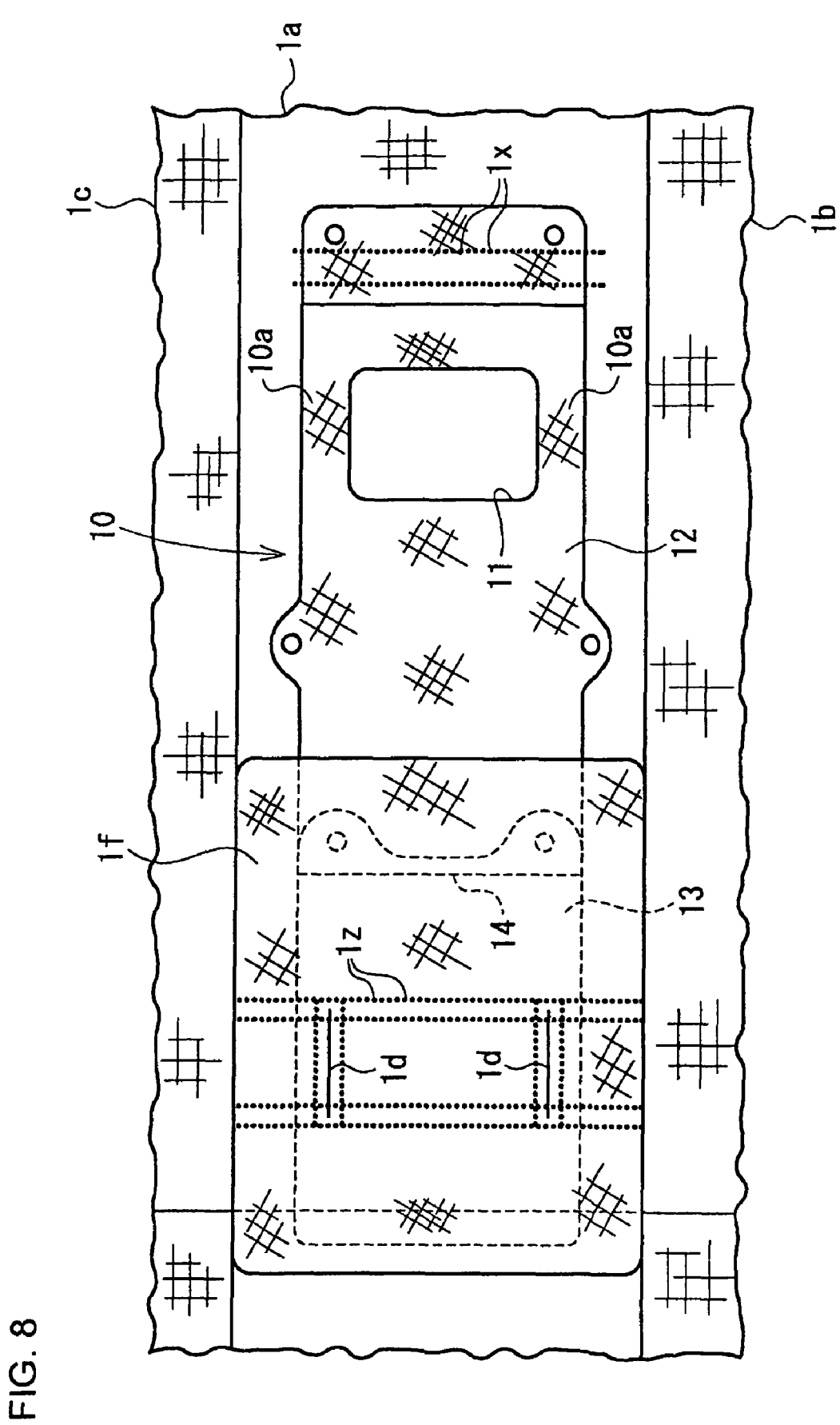
FIG. 8 is a plan view showing an arrangement of the regulation member in the airbag.
Figure 17:
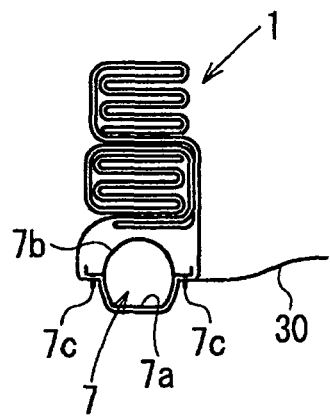
FIG. 17 is an explanatory view showing the process for folding the airbag.
Figure 18:
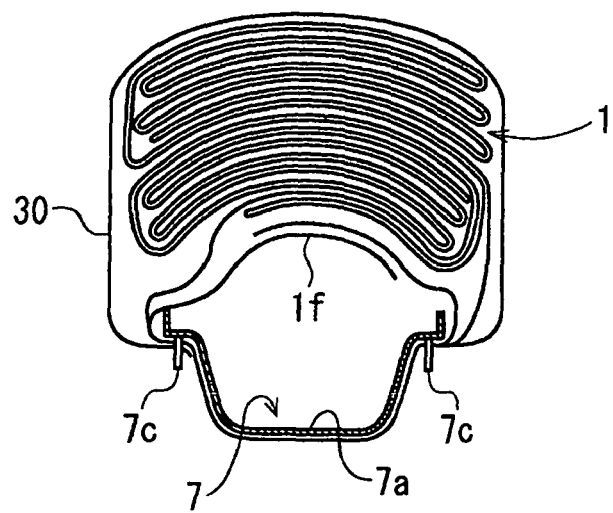
FIG. 18 is a sectional view of a folded airbag.
Figure 19:
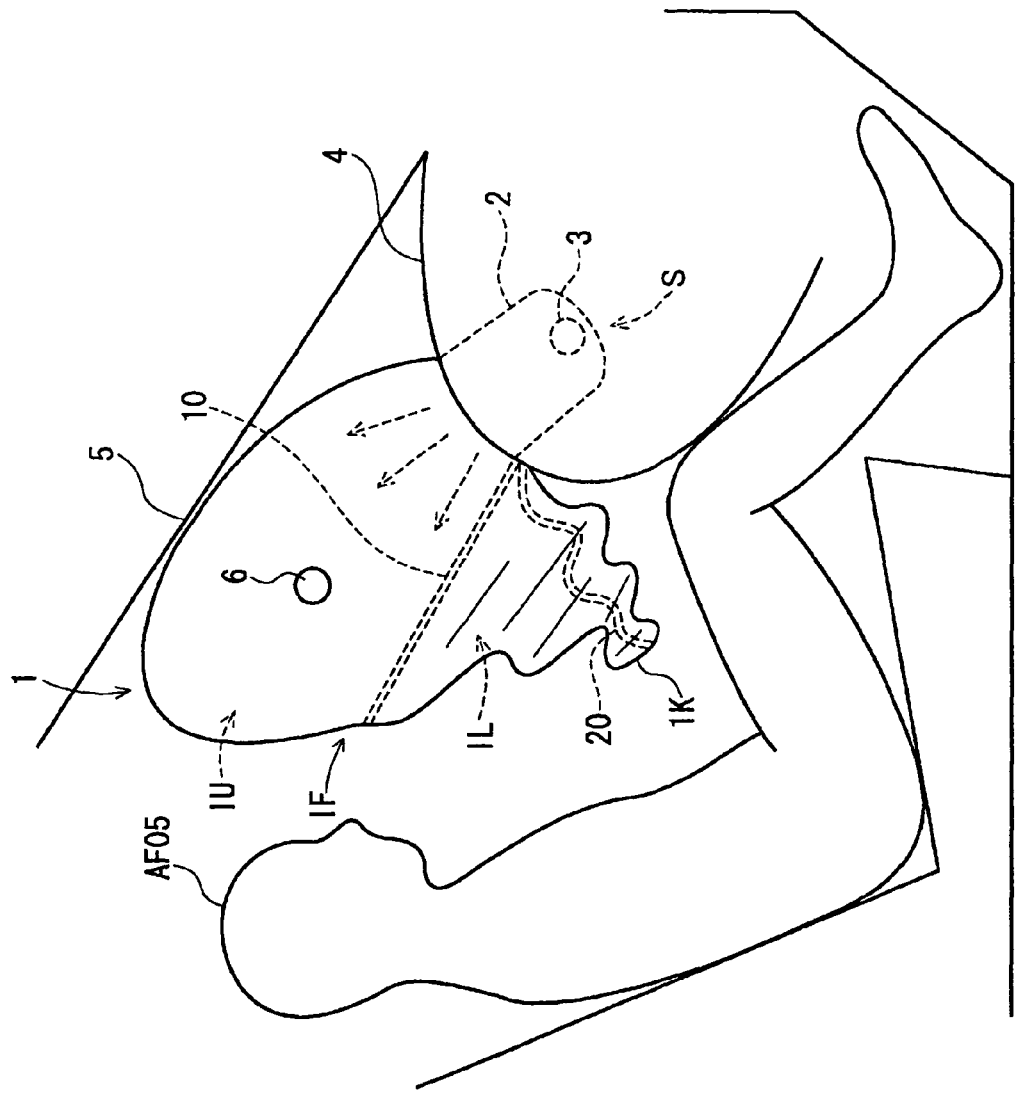
FIG. 19 is a side view showing a portion around a passenger seat inside a vehicle in the course of inflation of the airbag.
Figure 20:
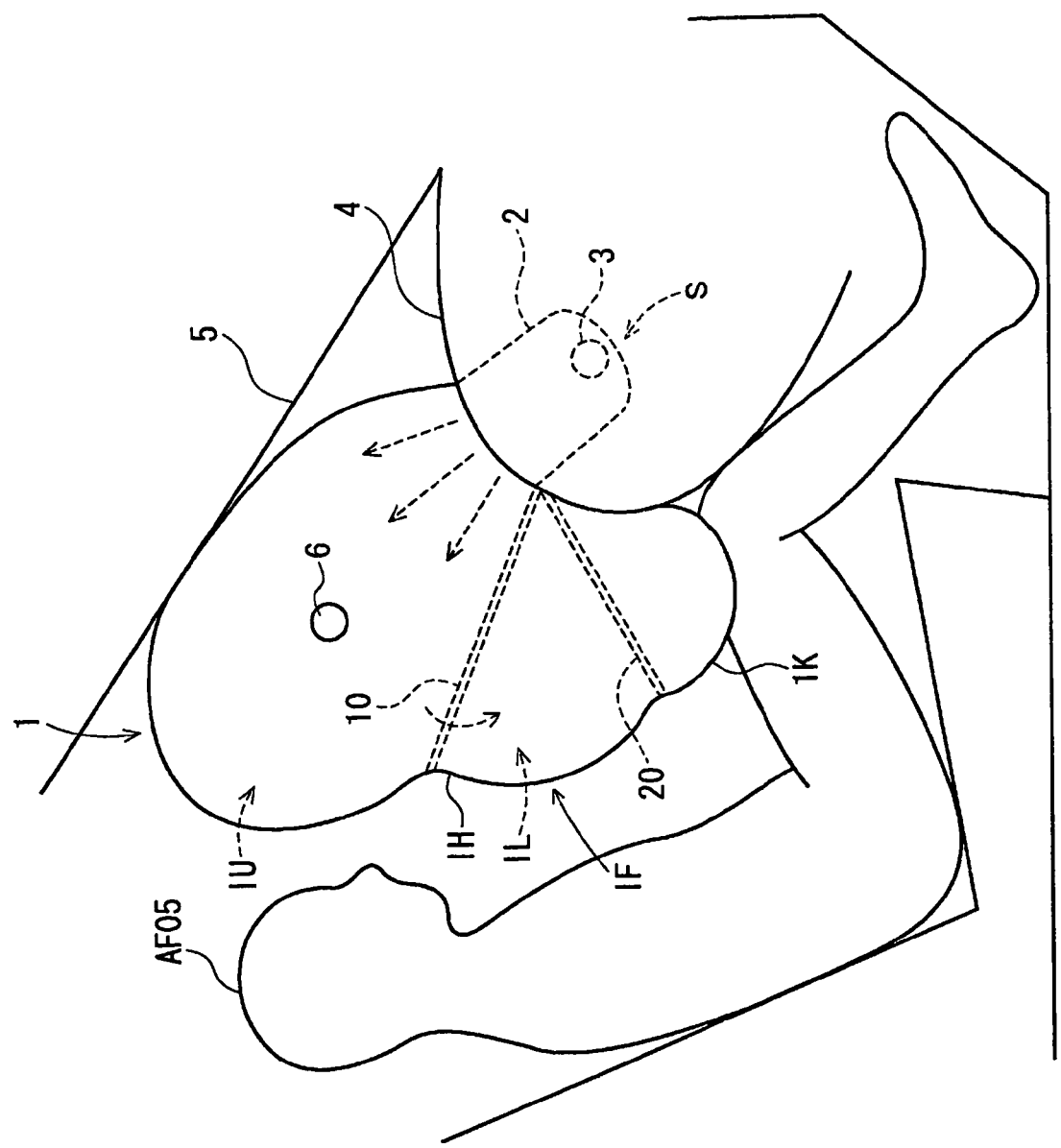
FIG. 20 is a side view showing the same portion as shown in FIG. 19 in the course of inflation of the airbag.
Figure 21:
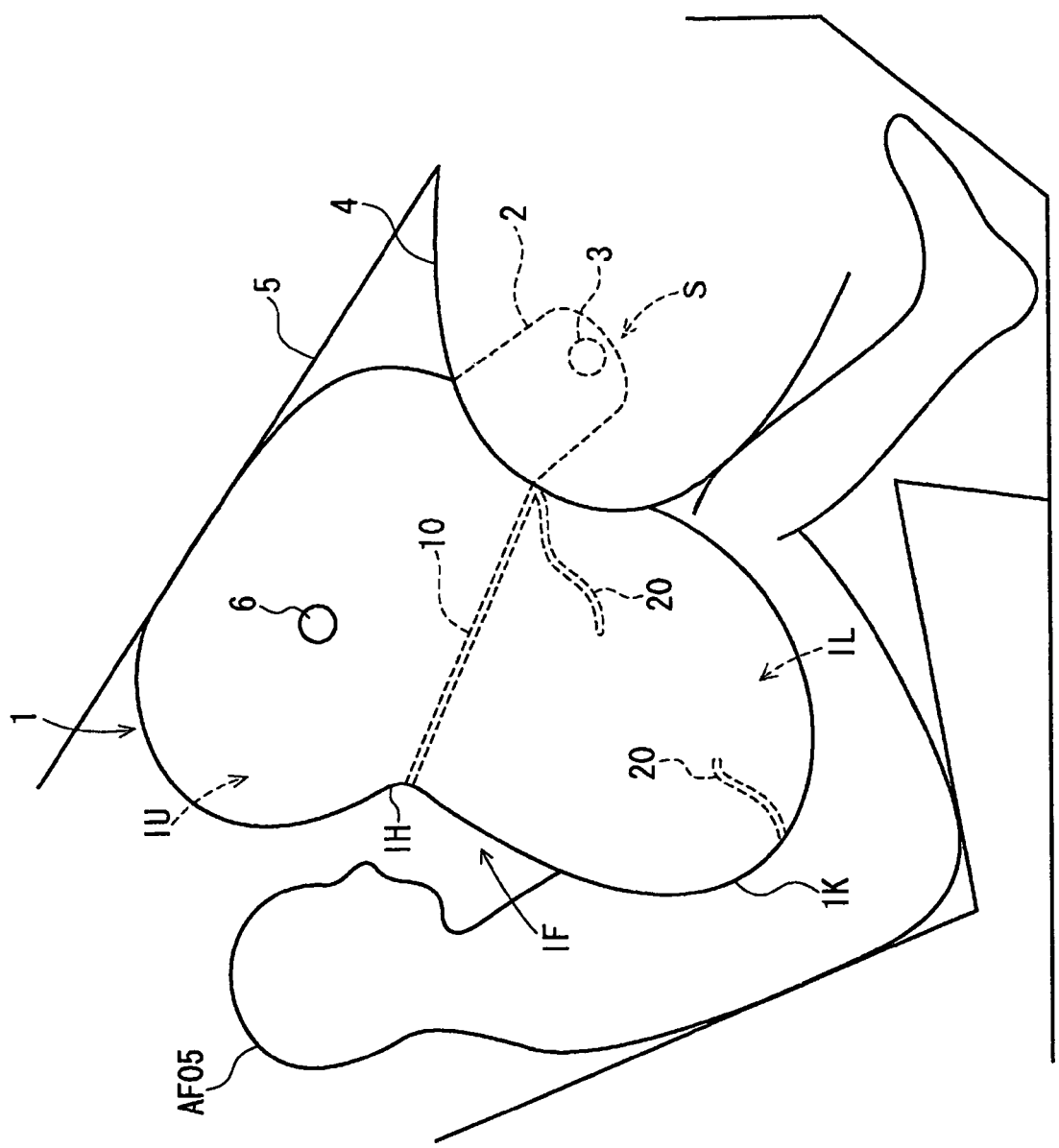
FIG. 21 is a side view showing the same portion as shown in FIGS. 19 and 20 representing the state where a small-sized occupant confronts the inflated airbag.
Figure 22:
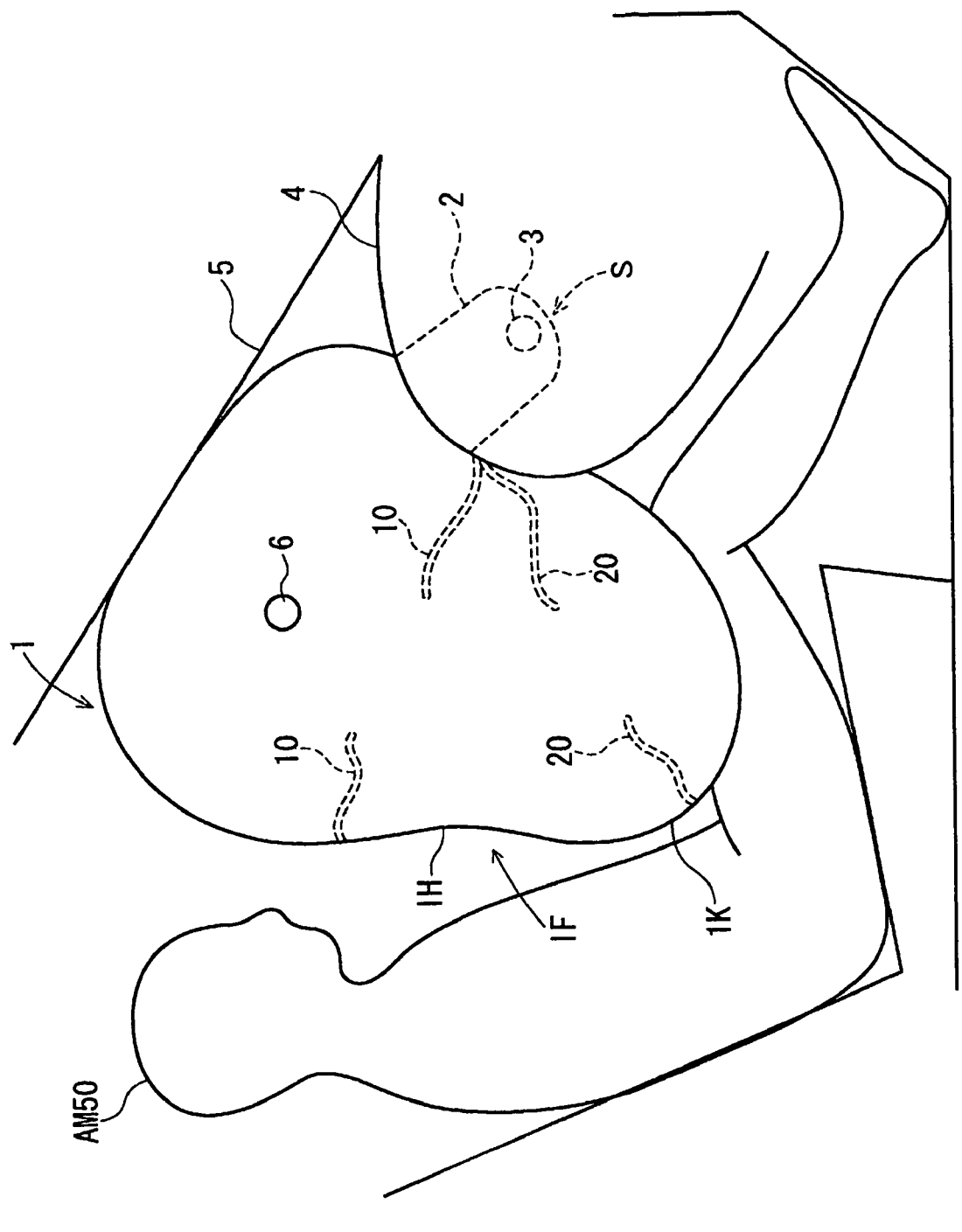
FIG. 22 is a side view showing the same portion as shown in FIGS. 19 to 21 representing the state where a large-sized occupant confronts the inflated airbag.
Figure 23:
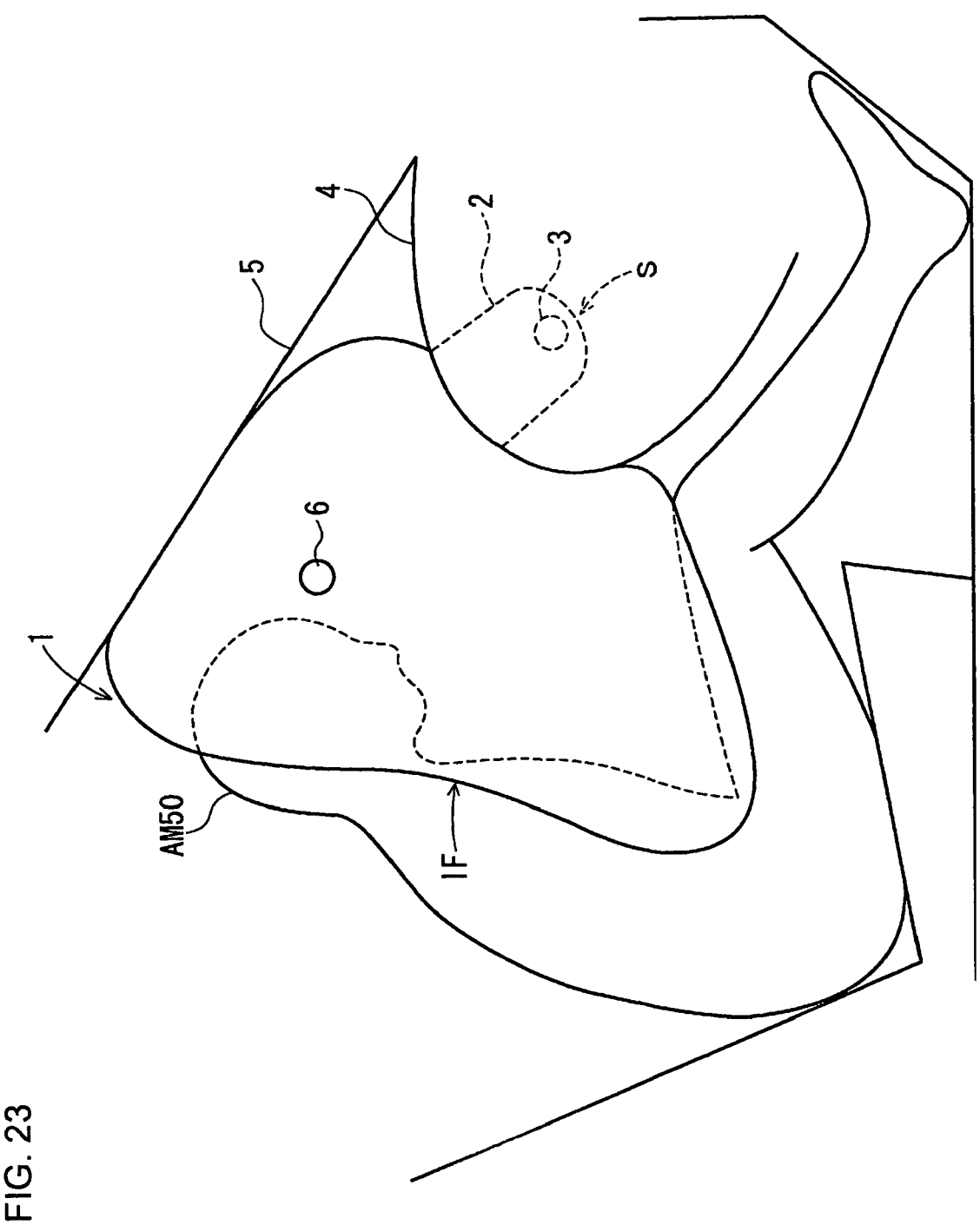
FIG. 23 is a side view showing the same portion as shown in FIGS. 19 to 22 representing the case where the large-sized occupant is protected by the inflated airbag.

FIG. 1 is a perspective view of an inflated airbag according to an embodiment of the present invention. FIG. 2(a) is a side view of the inflated airbag. FIG. 2(b) is a view seen from line 2(b)-2(b) of FIG. 2(a). FIG. 3 is a sectional view taken along line 3-3 of FIG. 2(b). FIG. 4(a) is a plan view of an upper regulation member. FIG. 4(b) is an exploded plan view of the upper regulation member. FIG. 5(a) is a plan view of a lower regulation member. FIG. 5(b) is an exploded perspective view of the lower regulation member. FIG. 6 is a plan view of the portion around the opening of the regulation member. FIG. 7 is a plan view of the same portion as illustrated in FIG. 6 upon rupture of the regulation member. FIG. 8 is a plan view showing an arrangement of the regulation member in the airbag. FIGS. 9 to 17 are explanatory views representing how the airbag is folded. FIG. 18 is a sectional view of the folded airbag. FIGS. 19 and 20 are side views showing the area around the passenger seat of the vehicle interior while the airbag is inflating. FIG. 21 is a side view of the same portion as illustrated in FIGS. 19 and 20 representing the state where the small-sized occupant confronts the inflated airbag. FIG. 22 is a side view of the same portion as illustrated in FIGS. 19 to 21 representing the state where the large-sized occupant confronts the inflated airbag. FIG. 23 is a side view representing the state where the large-sized occupant is protected by the inflated airbag.

Referring to FIGS. 9(a) to 12(b), FIGS. 9(a), 10(a), 11(a) and 12(a) represent front views of the airbag, and FIGS. 9(b), 10(b), 11(b) and 12(b) represent sectional views taken along the respective section lines in FIGS. 9(a) to 12(a). FIGS. 13 to 18 are sectional views of the airbag in the vertical direction.

In the following explanation, the longitudinal and lateral directions are defined as those with respect to the occupant.

An airbag 1 of the embodiment is a passenger airbag of a vehicle.

Referring to FIGS. 19 to 23, a passenger airbag device S of the embodiment includes the airbag 1, a case 2, an inflator and the like. The airbag 1 is folded to be stored in the case 2, which is inflated by the inflator 3. The case 2 is a container with an open upper surface which is covered with an instrument panel 4 of the vehicle. A windshield 5 is provided above the instrument panel 4.

Referring to FIGS. 2(a) and 2(b), gas supplied from the inflator 3 inflates the airbag 1 from the upper surface of the instrument panel 4 to fill the space between the instrument panel 4 and the windshield 5, and the space to the front of the passenger seat. The surface of the inflating airbag 1 to the rear of the vehicle body becomes an occupant counter surface 1F opposite the occupant who is seated on the passenger seat.

Referring to FIG. 2(a) of the embodiment, the airbag 1 is structured to form a recess portion 1H in an area of the occupant counter surface 1F, which confronts the head of the small-sized occupant to have a depth deeper than the surrounding area toward the side opposite the occupant upon inflation.

In the embodiment, the airbag 1 includes a center panel 1a which constitutes the occupant counter surface 1F and the upper and the lower surfaces continuously upon the inflation, and a pair of side panels 1b and 1c for constituting the left and right side surfaces, respectively.

Referring to FIG. 2(a), each of the side panels 1b and 1c has substantially a triangular shape with the width in the vertical direction increased toward the rear of the vehicle body. Each of the side panels 1b and 1c has a vent hole 6. The occupant counter surface 1F on the center panel 1a of the airbag 1 is formed along the rear sides of the side panels 1b and 1c. The upper surface of the airbag 1 is formed on the center panel 1a along the upper oblique sides of the side panels 1b and 1c, and the lower surface of the airbag 1 is formed on the center panel 1a along the lower diagonal sides of the side panels 1b and 1c. The center panel 1a has both ends disposed around corner portions of the side panels 1b and 1c to the front of the vehicle body, which are sewn together through stitching. A code is denotes a seam formed by sewing the panels (base cloth).

Each part of the rear sides of the side panels 1b and 1c, which confront the small-sized occupant head upon inflation of the airbag has a dent portion to the front of the vehicle body. Upon inflation of the airbag, the recess portion 1H is formed in the occupant counter surface 1F along the dents of the rear sides of the side panels 1b and 1c.

The panel structure of the airbag 1 and the method for forming the recess portion 1H are not limited to those described above.

Upon inflation of the airbag, the upper surface of the airbag 1 extends to the rear of the vehicle as it approaches the upper end side along inclination of the windshield 5.

A pair of slits 1d, 1d (FIG. 8) into which the inflator is inserted is formed around the end (front end) of the lower surface of the airbag 1 to the front of the vehicle upon its inflation. The slits 1d, 1d extend in substantially parallel with each other while being kept laterally apart.

A fix plate 7 (FIGS. 9(a) to 18) for fixing the airbag 1 to the case 2 is layered to the portion around the front end of the lower surface of the airbag 1 from its inner side.

The fix plate 7 has substantially a rectangular shape in a plan view. An inflation portion 7a with substantially a semi-circular shape which inflates outward of the airbag 1 is formed around the center of the fix plate 7. The inflation portion 7a has the axial core in substantially the lateral direction. The portion of the airbag 1 between the slits 1d, 1d on the lower surface is layered on the inner circumferential surface of the inflation portion 7a. The left end and the right end of the inflation portion 7a confront the left and right slits 1d, 1d, respectively. The left end and the right end of the fix plate 7 with respect to the inflation portion 7a are formed as C-like band portions 7b which coaxially extend inward of the airbag 1. An edge portion of the slit 1d opposite the inflation portion 7a is layered on the inner circumferential surface of the C-like band portion 7b.

In the embodiment, the inflator 3 has substantially a cylindrical shape, and is inserted into the airbag 1 via the respective slits 1d, 1d. The inflator 3 is held by the fix plate 7 while being fit with the insertion portion 7a of the fix plate 7 and having both ends pressed by the C-like band portions 7b.

A stud bolt 7c protrudes from the circumferential portion of the fix plate 7 outward of the airbag 1. The stud bolt 7c extends outward of the airbag 1 via a bolt insertion hole (not shown) formed in the lower surface of the airbag 1. The stud bolt 7c is used for connecting the front end of the lower surface of the airbag 1 to the bottom surface of the case 2.

A reinforcing cloth 1e is attached to the outer surfaces of the center panel 1a and the respective side panels 1b and 1c at the front end of the airbag 1 so as to be wrapped. An annular reinforcing cloth 6a is attached to the circumferential portion of each of the vent holes 6 so as to be surrounded.

A fireproof cloth 1f is provided in the airbag 1 for covering the inner surface of the airbag around the slits 1d, 1d and seamed portions for the respective panels 1a, 1b and 1c.

A regulation member 10 is provided in the airbag 1 for connecting the area around the recess portion of the occupant counter surface 1F which confronts the small-sized occupant head upon inflation of the airbag, and the portion around the front end of the airbag 1. In the embodiment, a sub-regulation member 20 is provided for connecting the area around 1K at the lower portion of the occupant counter surface 1F (portion located below the recess portion 1H upon inflation of the airbag 1), and the portion around the front end of the airbag 1.

In the embodiment, the regulation member 10 and the sub-regulation member 20 have wide band-like shapes, respectively, and are arranged to have each width direction substantially laterally aligned. Each panel structure of the regulation member 10 and the sub-regulation member 20 will be described in detail.

A code 1x denotes a seam having one end of the regulation member 10 sewn around the recess portion 1H. A code 1y denotes a seam having one end of the sub-regulation member 20 sewn around the lower portion 1K of the occupant counter surface 1F. A code 1z (FIGS. 3 and 8) denotes a seam having the other ends of the regulation member 10 and the sub-regulation member 20 sewn around the front end of the airbag 1, respectively. The method for connecting the regulation member 10 and the sub-regulation member 20 to the airbag 1 is not limited to the sewing operation.

In the description, the regulation member 10 will be referred to as an upper regulation member, and the sub-regulation member 20 will be referred to as a lower regulation member, which are collectively referred to as the regulation members 10 and 20, respectively.

When the airbag 1 is inflated, it is preferable to set a distance D along the outer surface of the center panel 1a from the joint portion (seam 1x) between the upper regulation member 10 and the recess portion 1H of the occupant counter surface 1F to the joint portion (seam 1y) between the lower regulation member 20 and the lower portion 1K of the occupant counter surface 1F to be in the range from 400 to 440 mm, and more preferably to 410 to 430 mm.

Preferably, the upper regulation member 10 has the length which is 60 to 80%, and more particularly, 65 to 75% of the linear distance from the recess portion 1H (seam 1x) to the front end (seam 1z) of the airbag 1 when the airbag 1 is inflated to the maximum inflated shape without being restricted by the regulation members 10 and 20 as shown in FIG. 22. Preferably, the lower regulation member 20 has the length which is 40 to 60%, and more preferably to 45 to 55% of the linear distance from the lower portion 1K (seam 1y) of the occupant counter surface 1F to the front end (seam 1z) of the airbag 1 when the airbag 1 is inflated to the maximum inflated shape.

Referring to FIGS. 4(a) and 5(a), openings 11 and 21 which penetrate the regulation members 10 and 20 in the thickness direction are formed at intermediate portions of the respective regulation members 10 and 20 in the longitudinal direction. Those openings 11 and 21 are formed around intermediate portions of the respective regulation members 10 and 20. Each of the portions between those openings 11 and 21 and the respective left and right side surfaces of the regulation members 10 and 20 has a width smaller than that of any other portion of the regulation members 10 and 20. The aforementioned portions become fragile portions 10a and 20a each with the rupture strength lower than that of any other portion of the regulation members 10 and 20.

In the state where the upper regulation member 10 is strongly pulled in the airbag 1, it is preferable to have the opening 11 or the fragile portion 10a separated apart from the front end (seam 1z) of the upper regulation member 10 by 210 to 240 mm, and more preferably, 220 to 230 mm.

In the state where the lower regulation member 20 is strongly pulled in the airbag 1, it is preferable to have the opening 21 or the fragile portion 20a spaced apart from the front end (seam 1z) of the lower regulation member 20 by 190 to 220 mm, and more preferably, 200 to 215 mm.

Referring to FIGS. 4(a) and 5(a), a width $W_1$ of the fragile portion 10a of the upper regulation member 10 is larger than a width $W_2$ of the fragile portion 20a of the lower regulation member 20. The fragile portion 10a of the upper regulation member 10 exhibits the rupture strength against the tensile force T (FIG. 6) applied to the regulation member 10 higher than that of the fragile portion 20a of the lower regulation member 20.

It is preferable to set the width $W_1$ of the fragile portion 10a to be in the range from 25 to 30 mm, and more preferably from 27 to 29 mm. It is preferable to set the width $W_2$ of the fragile portion 20a to be in the range from 17 to 23 mm, and more preferably from 19 to 21 mm.

The lower regulation member 20 is structured to have the fragile portion 20a ruptured under the tensile force applied to the regulation member 20 after an elapse of preferably 5 to 35 msec, and more preferably, 10 to 30 msec from the start of inflation of the airbag 1 to release the connection between the lower portion 1K of the occupant counter surface 1F and the front end of the airbag 1.

Upon inflation of the airbag 1 subsequent to the rupture of the lower regulation member 20, the upper regulation member 10 is structured to have the fragile portion 10a ruptured under the tensile force applied to the regulation member 10 after an elapse of preferably 15 to 40 msec and more preferably, 30 to 40 msec from the start of inflation of the airbag 1 so as to release the connection between the recess portion 1H of the occupant counter surface 1F and the front end of the airbag 1.

The respective structures of the regulation members 10 and 20 will be described in more details.

In the embodiment, the regulation member 10 includes a first half panel 12 having one end joined with a portion around the recess portion 1H of the occupant counter surface 1F with the seam 1x, and a second half panel 13 having one end joined with the portion around the front end portion of the lower surface of the airbag 1 with the seam 1z. The other ends of the first half panel 12 and the second half panel 13 are joined with a seam 14.

The regulation member 20 includes a first half panel 22 having one end joined with a portion around the lower portion 1K of the occupant counter surface 1F with the seam 1y, and a second half panel 23 having one end joined with a portion around the front end of the lower surface of the airbag 1 with the seam 1z. The other ends of the first half panel 22 and the second half panel 23 are joined together with a seam 24.

The openings 11 and 21 are formed around each end of the first half panels 12 and 22, respectively.

Each of the half panels 12, 13, 22 and 23 is formed of the woven cloth woven by warp and woof, respectively.

In the embodiment, each of the first half panels 12 and 22 is cut from the woven cloth such that the weaving direction of the woven cloth (extending directions of warp and woof) is obliquely crossed with respect to the longitudinal directions of the regulation members 10 and 20, that is, the tensile direction.

In the present invention, preferably an angle defined by the weaving direction of the woven cloth of the first half panels 12, 22 and the tensile direction T of the regulation members 10, 20, that is, the angle $\theta_1$ defined by an extending direction $E_1$ of warp and the tensile direction T of the regulation member 20, and the angle $\theta_2$ defined by an extending direction $E_2$ of woof of the woven cloth and the tensile direction T of the regulation member 20 are set to be in the ranges from 30 to 60°, and more preferably, 40 to 50°.

A width $W_3$ (FIG. 4(a)) of the opening 11 and a width $W_4$ (FIG. 5(a)) of the opening 21 of the regulation members 10 and 20 in the longitudinal directions are set such that the warp and woof of the woven cloth are not continued from each one end of the fragile portions 10a, 20a to the other end, and are cut along the lateral sides of the regulation members 10, 20 or sides of the openings 11, 21 at the intermediate portion of the fragiles 10a, 20a in the longitudinal direction.

It is preferable to set the width $W_3$ of the opening 11 to be in the rage from 25 to 30 mm, and more preferably, 27 to 29 mm. It is preferable to set the width $W_4$ of the opening 21 to be in the range from 17 to 23 mm, and more preferably, 19 to 21 mm.

In the embodiment, the second half panels 13, 23 are cut from the woven cloth such that the weaving directions of the woven cloth become substantially in parallel with and substantially orthogonal to the longitudinal directions or tensile directions of the regulation members 10, 20, respectively. The second half panels 13, 23 exhibit high rupture strength with respect to the tensile force T compared with the case of the first half panels 12, 22.

Figure 12A:
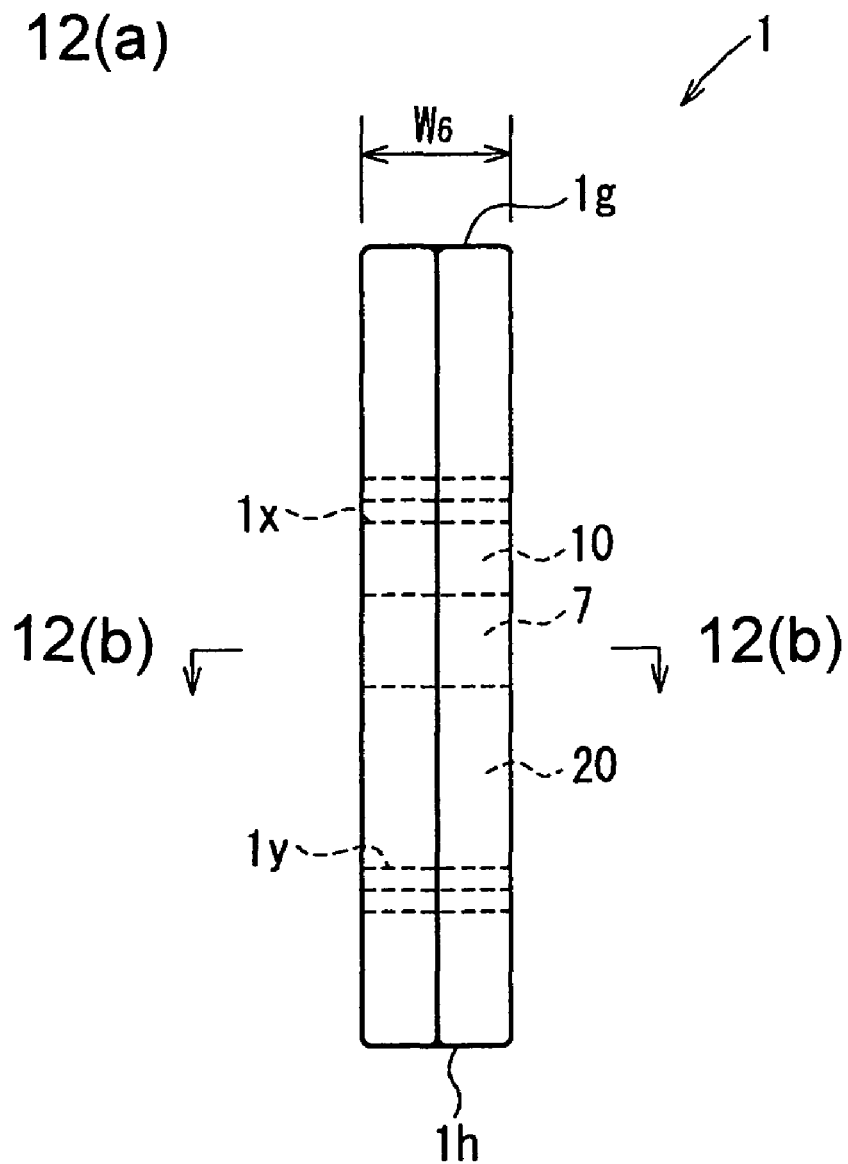
FIGS. 12(a) and 12(b) are explanatory views showing the process for folding the airbag.

In the embodiment, a width $W_5$ (FIG. 4(a)) orthogonal to the longitudinal direction of the upper regulation member 10 is substantially the same as a width $W_6$ (FIG. 12(a)) in the lateral direction of the airbag 1 in the folded state as described below. In the embodiment, the airbag 1 is folded to have substantially the same left and right widths as those of the fix plate 7. In the embodiment, it is preferable to set the width $W_5$ of the upper regulation member 10 to be in the range from 100 to 200 mm, and more preferably, from 140 to 160 mm.

In the embodiment, the lower regulation member 20 has substantially the same width as that of the upper regulation member 10.

In the embodiment, an extending portion 15 extends from one end of the first half panel 12 of the upper regulation member 10 in an extending direction thereof. The extending portion 15 is folded back to the other end of the first half panel 12 so as to be sewn with a seam 16. As a result, the strength of one end of the first half panel 12 is intensified to be solidly joined with the occupant counter surface 1F with the seam 1x.

It is preferable to set a length $L_1$ of the first half panel 12 (length between the seams 1x and 14) of the upper regulation member 10 to be in the range from 270 to 310 mm, and more preferably, from 280 to 300 mm approximately. It is preferable to set a length $L_2$ of the second half panel 13 (length between the seams 14 and 1z) to be in the range from 20 to 60 mm, and more preferably, from 30 to 50 mm approximately. It is preferable to set a length $L_3$ of the first half panel 22 of the lower regulation member 20 (length between seams 1y and 24) to be in the range from 210 to 250 mm, and more preferably, from 220 to 240 mm. It is preferable to set a length $L_4$ of the second half panel 23 (length between the seams 24 and 1z) to be in the range from 50 to 90 mm, and more preferably, from 60 to 80 mm approximately.

In the embodiment, the front end of the second half panel 23 of the lower regulation member 20 is overlapped with the lower surface of the airbag 1 around the front end, on which the front end of the second half panel 13 of the upper regulation member 10, and the fireproof cloth 1f are overlapped. They are integrally sewn to the lower surface of the airbag 1 with the seam 1z as shown in FIG. 3. Although not shown in the drawing, the slits and bolt insertion holes are formed in the second half panels 13, 23 and the fireproof cloth 1f corresponding to the slits 1d, 1d and the bolt insertion holes formed in the lower surface of the airbag 1.

The fix plate 7 is overlapped with the lower surface of the airbag 1 from above the fireproof cloth 1f. The upper regulation member 10 extends from the rear edge of the fix plate 7 to the rear of the vehicle body. In the embodiment, the front end of the upper regulation member 10 is overlapped with the lower surface of the airbag 1 at the location closer to the rear of the vehicle body than the inflator 3.

Referring to FIG. 8, in the embodiment, the fireproof cloth 1f has the size sufficient to allow its rear edge to cover the joint portion (seam 14) between the half panels 12 and 13 of the upper regulation member 10.

In the embodiment, a heat-resistant resin coating is applied to at least the upper surface of the first half panel 12 and the second half panel 13 of the upper regulation member upon inflation of the airbag. The heat-resistant resin coating may be applied to the lower surface of the first half panel 12 and the second half panel 13. Alternatively, the heat-resistant resin coating may be partially applied to the desired portion of the first half panel 12 and the second half panel 13. The heat-resistant resin coating may be applied to the first half panel 22 and the second half panel 23 of the lower regulation member 20.

The thus structured airbag 1 is folded and held by the shape retaining cloth 30 so as to be stored in the case 2. The shape retaining cloth 30 has a perforated rupture-planned portion 31. The shape retaining cloth 30 ruptures along the rupture-planned portion 31 upon inflation of the airbag to release the shape of the airbag which has been kept folded.

In the embodiment, the shape retaining cloth 30 has a band-like shape with one end (proximal end) connected to the front end of the airbag 1. The other end (leading end) of the shape retaining cloth 30 has a bolt insertion hole 32 through which the stud bolt 7c is inserted.

The process for folding the airbag 1 will be described hereinafter.

Referring to FIGS. 9(a) and 9(b), the occupant counter surface 1F is brought into close to the front end of the airbag 1 while being vertically and laterally stretched to extend the airbag 1 to be flattened. Codes 1g, 1h, 1i and 1j denote upper end, lower end, left end and right end of the extended flat airbag 1 as described above.

The portion of the upper regulation member 10 at the rear end (side of the occupant counter surface 1F) is pulled toward the upper end 1g of the airbag 1 therein such that the upper regulation member 10 is tensely stretched from the front end (front end of the airbag 1) to the portion around the rear end along the occupant counter surface 1F.

Figure 10A:
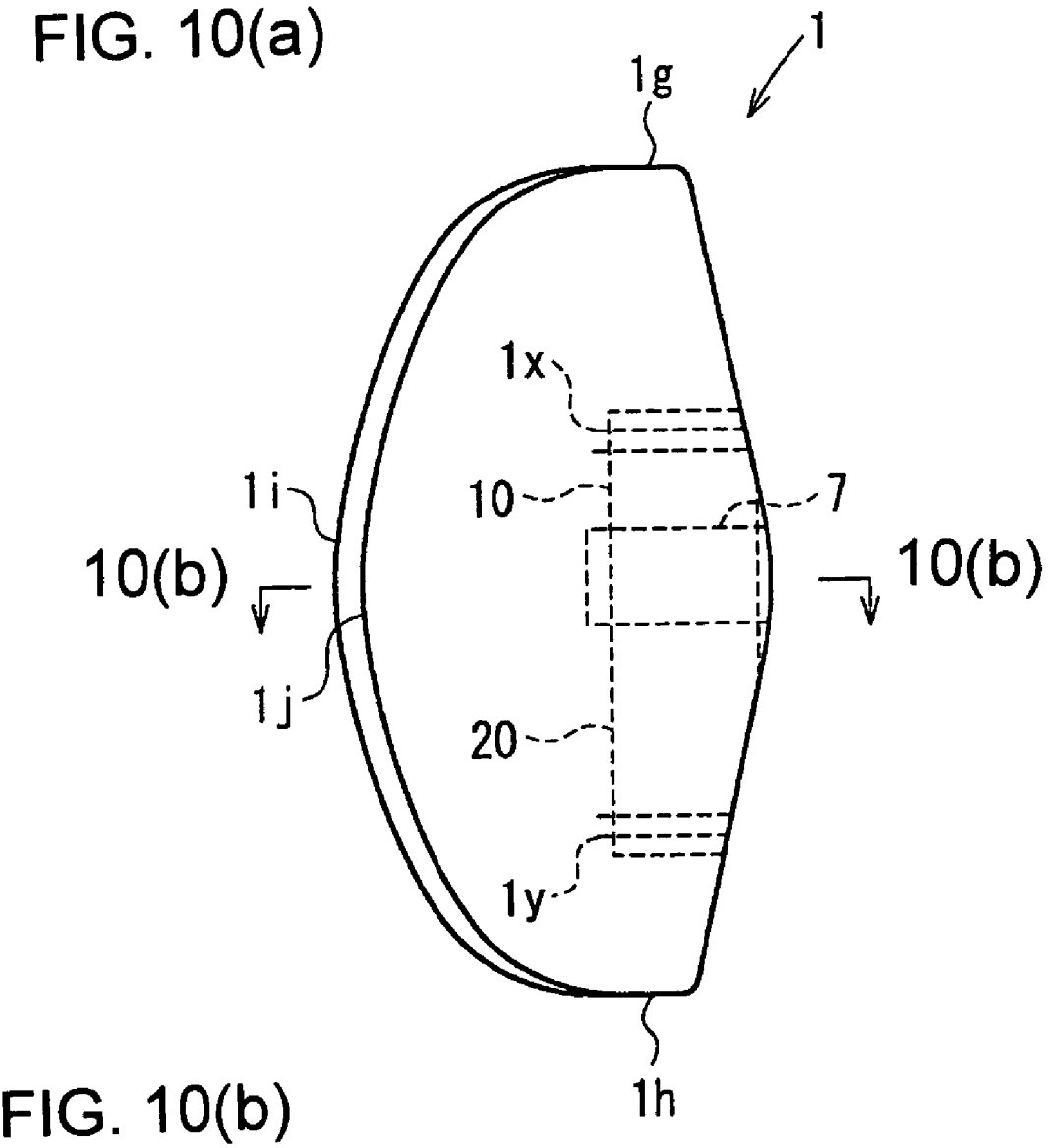
FIGS. 10(a) and 10(b) are explanatory views showing the process for folding the airbag.
Figure 10B:
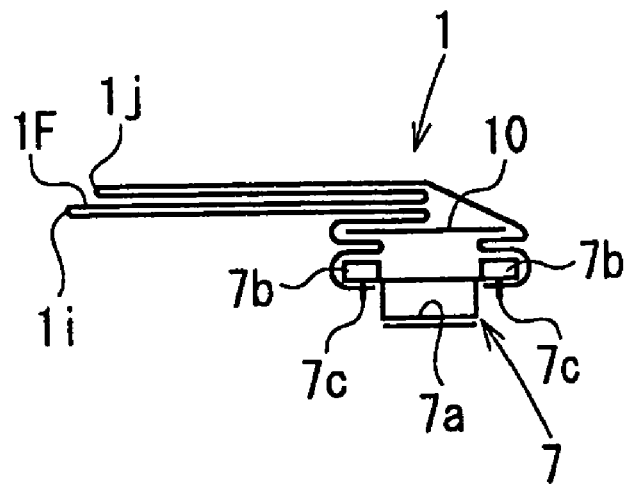
Figure 11A:
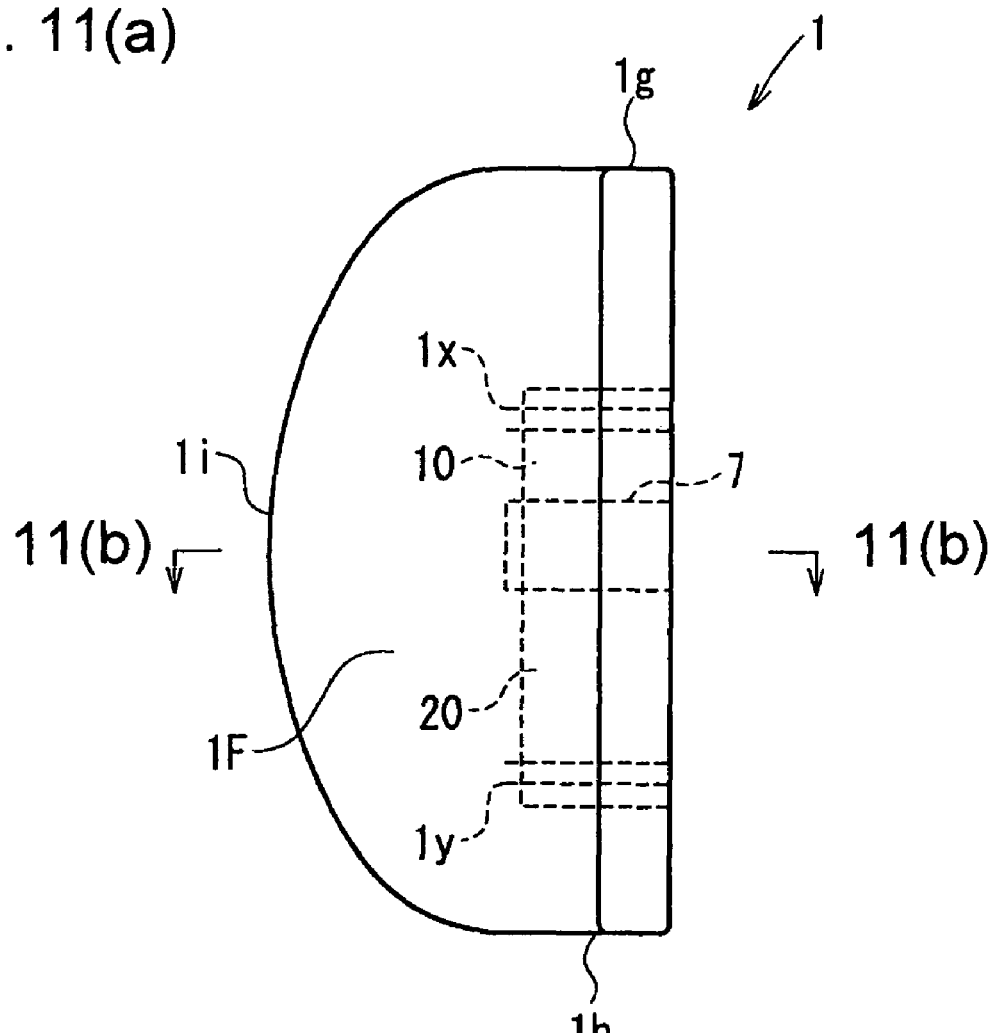
FIGS. 11(a) and 11(b) are explanatory views showing the process for folding the airbag.
Figure 11B:
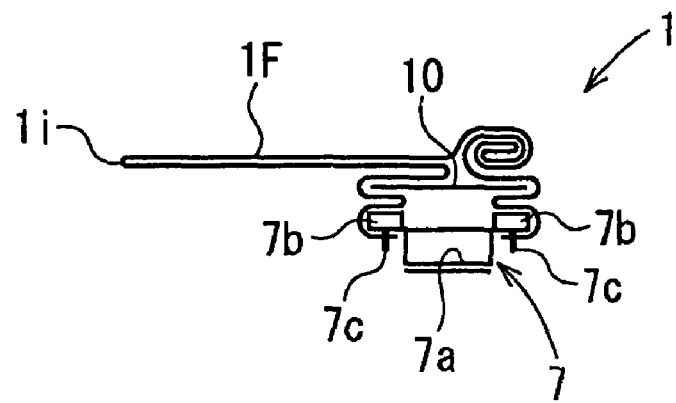
Figure 12B:
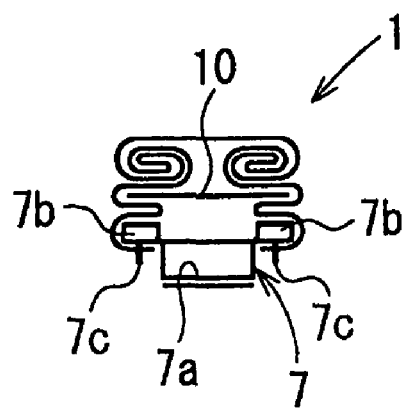

Referring to FIGS. 10(a) and 10(b), the right half of the airbag 1 from the portion around the center of the airbag 1 in the lateral direction is folded on the left half of the occupant counter surface 1F. Referring to FIGS. 11(a) and 11(b), the right half of the airbag 1 is folded back to the right by a predetermined width from the right end 1j for roll folding. Referring to FIGS. 12(a) and 12(b), the left half of the airbag 1 is also folded back toward the center of the airbag by a predetermined width for roll folding. At this time, the sum total value $W_6$ of the left and right widths of the roll folded right and left half sides of the airbag is set to be substantially the same as the value of the left and the right widths of the fix plate 7.

The right half side of the airbag 1 may be folded after folding the left half side of the airbag 1.

Referring to FIG. 12(b), the width of the upper regulation member 10 is substantially the same as the right/left width $W_6$ of the folded airbag 1. The upper regulation member 10 extends in the folded airbag 1 to separate the inside of the airbag 1 into the space at the upper end 1g side and the space with the lower end 1h side with respect to the upper regulation member 10. Hereinafter, the space at the upper end 1g above the upper regulation member 10 will be referred to as an upper chamber 1U, and the space at the lower end 1h below the upper regulation member 10 will be referred to as a lower chamber 1L, respectively.

As described above, in the embodiment, the front end of the upper regulation member 10 is connected to the lower surface of the airbag 1 at the position closer to the rear of the vehicle than the inflator 3. So the inflator 3 confronts the upper chamber 1U as shown in FIG. 9(b).

Figure 13:
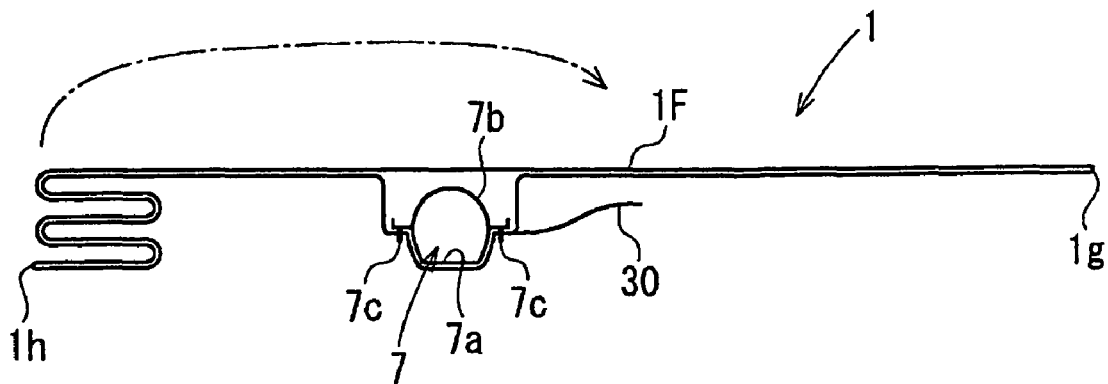
FIG. 13 is an explanatory view showing the process for folding the airbag.
Figure 14:
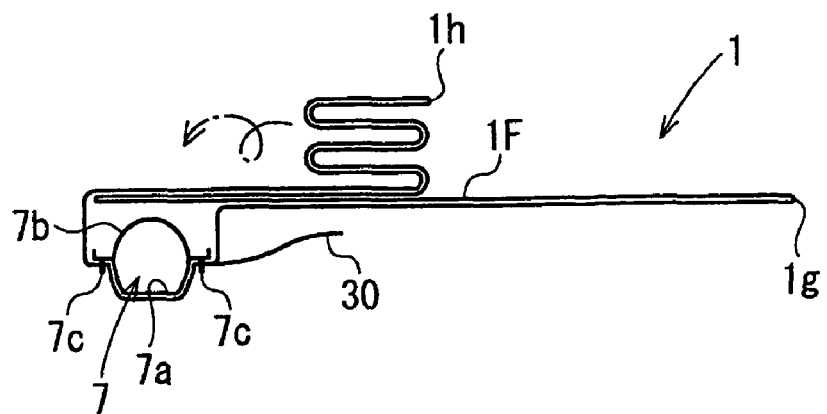
FIG. 14 is an explanatory view showing the process for folding the airbag.
Figure 15:
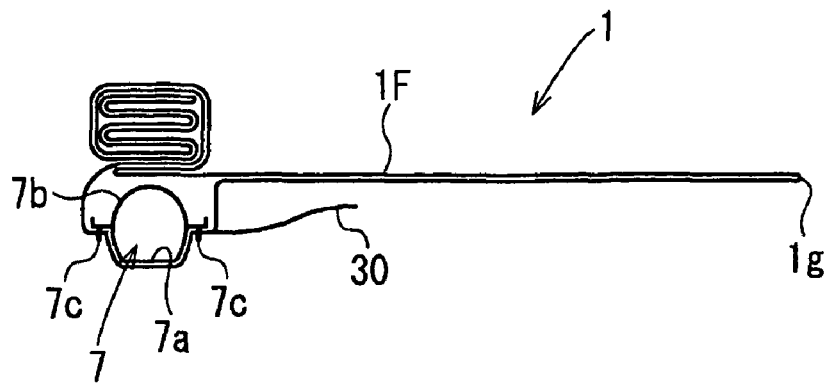
FIG. 15 is an explanatory view showing the process for folding the airbag.

Referring to FIG. 13, the airbag 1 is zigzag folded from the lower end 1h to a predetermined position closer to the lower end 1h than the center of the airbag 1 in the vertical direction to the side opposite the occupant counter surface 1F. Referring to FIG. 14, the lower half side of the airbag 1 including the zigzag folded portion is folded back from the location around the center of the airbag 1 on the occupant counter surface 1F at the upper half side. Thereafter, as shown in FIG. 15, the lower half side of the airbag 1 is roll folded to the center side so as to enclose the zigzag folded portion by the rest of the lower half side of the airbag 1.

Figure 16:
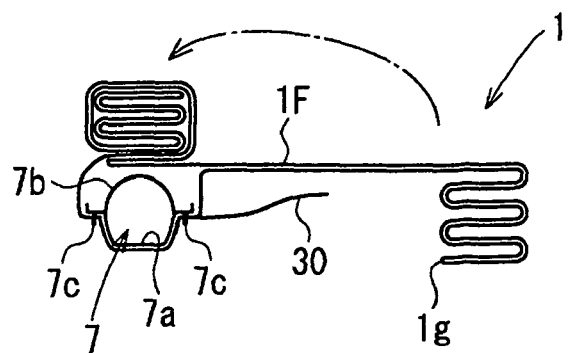
FIG. 16 is an explanatory view showing the process for folding the airbag.

Referring to FIG. 16, the airbag 1 is zigzag folded from the upper end 1g to a predetermined position closer to the upper end 1g than the center of the airbag in the vertical direction to the side opposite the occupant counter surface 1F. Then as shown in FIG. 17, the zigzag folded portion is placed on the folded lower half side of the airbag 1 while being wrapped by the rest of the upper half of the airbag 1.

Thereafter, referring to FIG. 18, the shape retaining cloth 30 is wound around the folded airbag 1 and is fixed by inserting the stud bolts 7c into the bolt insertion holes 32 at the leading end side.

The folding of the airbag 1 is completed.

The folding process as described above is a mere example. In the present invention, the airbag 1 may be folded through the process other than the one as described above.

An operation of a passenger airbag device S provided with the thus structured airbag 1 will be described.

Upon collision of the vehicle provided with the passenger airbag device S, the inflator 3 is activated to blow gas to start inflating the airbag 1. The airbag 1 forcibly opens the lid to inflate from the upper surface of the instrument panel 4 to the vehicle interior.

The inner space of the folded airbag 1 is separated by the upper regulation member 10 into the upper chamber 1U thereabove and the lower chamber 1L therebelow. As the inflator 3 confronts the upper chamber 1U, the gas from the inflator 3 mainly flows into the upper chamber 1U. So the upper chamber 1U of the airbag 1 quickly inflates. At this time, as the opening 11 of the upper regulation member 10 is spaced apart from the front end of the upper regulation member 10, the blown gas from the inflator 3 is guided by the upper regulation member 10 to flow toward the occupant. As a result, the upper chamber 1U inflates quickly to the occupant side.

The airbag 1 has the lower half side folded, and the upper half side folded to be placed on the folded lower half side. Accordingly, the upper half side deploys to the vehicle interior prior to the lower half in the vehicle interior. Referring to FIG. 19, the upper half side of the airbag 1 quickly inflates and deploys to fill the space between the instrument panel 4 and the windshield 5, and the space to the front of the occupant head.

The occupant counter surface 1F inflates toward the occupant side until the upper regulation member 10 is tensely pulled.

The gas flowing into the upper chamber 1U from the inflator 3 flows into the lower chamber 1L through the opening 11 of the upper regulation member 10 and the space between the upper regulation member 10 and the left and right side surfaces of the airbag 1. Referring to FIGS. 19 and 20, the lower half side of the airbag 1 inflates and deploys to fill the space to the front of the occupant torso part. The lower portion 1K of the occupant counter surface 1F inflates to the occupant side until the lower regulation member 20 is tensely pulled.

The lower regulation member 20 connects the lower portion 1K of the occupant counter surface 1F with the front end of the airbag 1 until an elapse of preferably 5 to 35 msec and more preferably 10 to 30 msec from the moment at which the airbag 1 starts inflating. This may prevent or suppress flopping of the lower half side of the airbag 1 in the initial inflation stage thereof. As the lower regulation member 20 reduces the capacity of the lower half side of the airbag 1, the inner pressure of the airbag 1 may be rapidly boosted.

The lower regulation member 20 ruptures upon elapse of preferably 5 to 35 msec., and more preferably 10 to 30 msec from the moment when the airbag 1 starts inflating. As a result, the lower half side of the airbag 1 further inflates toward the occupant to restrict the lower body of the occupant as shown in FIG. 21.

The upper regulation member 10 ruptures subsequent to the rupture of the lower regulation member 20 upon elapse of preferably 15 to 40 msec and more preferably, 30 to 40 msec from the moment when the airbag 1 starts inflating.

In the case where the small-sized occupant is seated by sliding the seat forward, there may be the case where the occupant head is in contact with the airbag 1 before rupture of the upper regulation member 10 from the moment when the airbag 1 starts inflating. In the aforementioned case, as the upper regulation member 10 has not ruptured yet, the recess portion 1H of the occupant counter surface 1F, which confronts the small-sized occupant head is pulled toward the side opposite the occupant by the upper regulation member 10. This makes it possible to prevent the small-sized occupant head from strongly contacting with the portion around the recess portion 1H, thus protecting the small-sized occupant head relatively softly.

Figure 25:
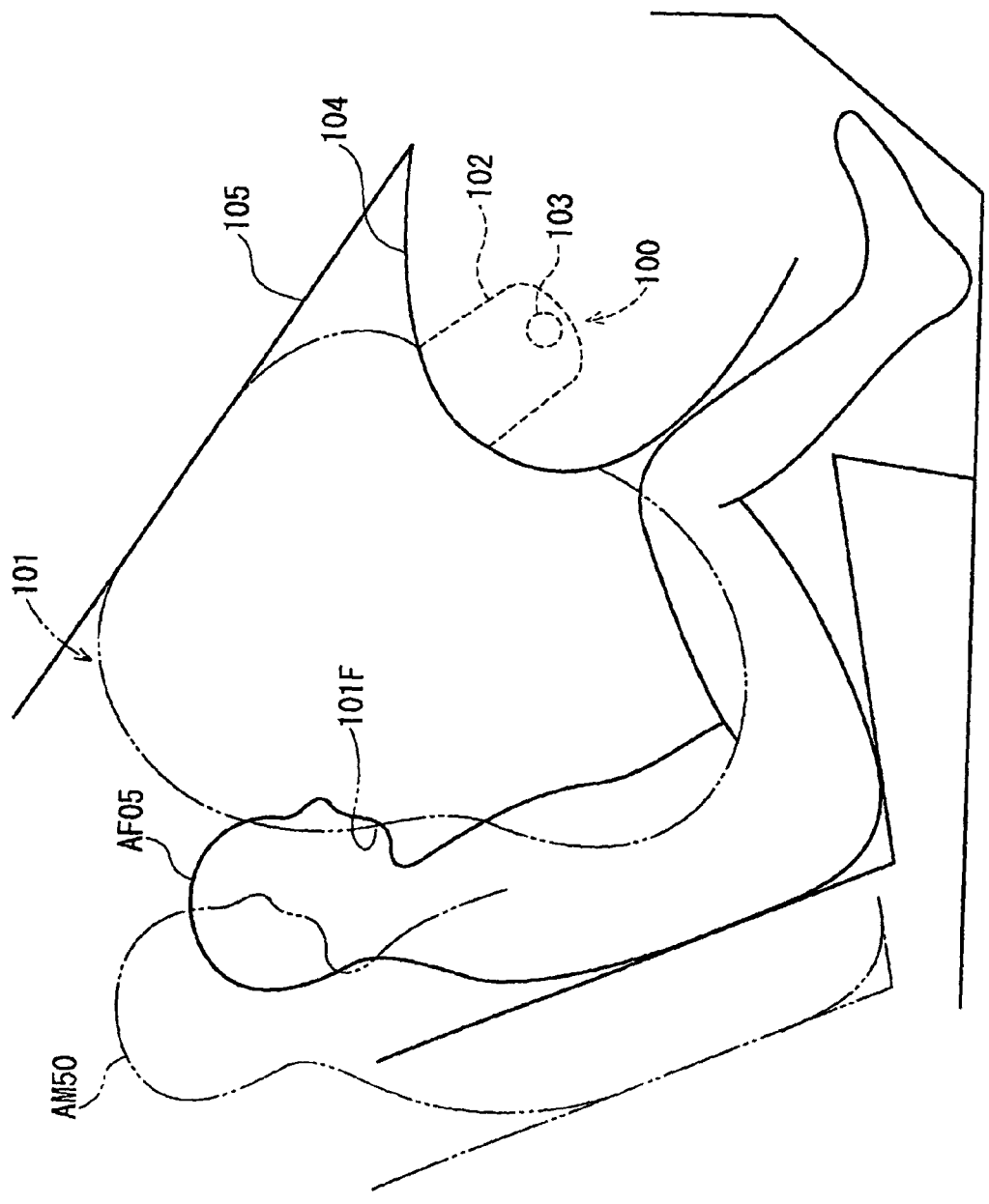
FIG. 25 is a side view of a vehicle interior representing a passenger airbag device as a related art.

In the case where the occupant is seated without sliding the seat forward, the occupant head generally contacts with the airbag 1 after the rupture of the upper regulation member 10. In this case, the upper regulation member 10 ruptures prior to the contact of the occupant head with the airbag 1. As a result, the upper side of the airbag 1 further inflates toward the occupant, and deploys to form the maximum inflation shape as shown in FIG. 23. As a result, the occupant head may be protected by the airbag 1 before excessively moving forward. The thickness of the inflated airbag 1 at the upper side in the longitudinal direction of the vehicle may be sufficiently large to restrict the forward movement of the occupant head as shown in FIG. 25.

In the case where the occupant is positioned forward of the regular seated position, that is, the occupant is in the out-of-position state, the occupant may contact with the airbag in the earlier stage after the moment when the airbag 1 starts inflating. The airbag 1 has the capacity reduced by the respective regulation members 10 and 20 in the earlier inflation stage to rapidly boost the inner pressure of the airbag 1. The occupant in the out-of-position state may be sufficiently protected.

In the embodiment, each weaving direction of warp and woof of the woven cloth at the fragile portions 10a and 20a of the regulation members 10 and 20 is in the obliquely crossed direction with respect to the tensile direction T of the respective regulation members 10 and 20. The warp and woof are not continuous from each one end to the other end of the fragile portions 10a and 20a. That is, they are discontinued in the intermediate position of the fragile portions 10a and 20a in the longitudinal direction, respectively. If the predetermined or higher tensile force is applied to the respective regulation members 10 and 20, the warp and woof of the woven cloth constituting the respective fragile portions 10a and 20a are pulled out from the weaving structure to loosen the woven cloth. The respective fragile portions 10a and 20a are ruptured.

In the case where the weaving direction of the woven cloth constituting the fragile portions 10a and 20a is substantially the same as the tensile direction T of the regulation members and 20, one of the warp and woof of the woven cloth is continued from each one end to the other end of the fragile portions 10a and 20a before they are ruptured. Upon rupture of the fragile portions 10a and 20a, the thread continued from each one end to the other of the fragile portions 10a and 20a has to be cut. In the airbag device structured to rupture the fragile portions 10a and 20a by cutting the thread, the rupture strength of the thread is highly dependent on the temperature. It is therefore susceptible to the influence of heat of the gas blown from the inflator 3. The timing at which the thread is cut, that is, the timing of the rupture of the fragile portions 10a and 20a is likely to fluctuate depending on the configuration and layout of the inflator 3.

Upon rupture of the fragile portions 10a and 20a of the airbag 1 according to the embodiment, the warp and woof of the woven cloth are not cut but pulled out from the weaving structure to loosen the weaving of the woven cloth to rupture the fragile portions 10a and 20a. The aforementioned structure is insusceptible to the influence of heat of the gas blown from the inflator 3 upon rupture of the fragile portions 10a and 20a. So the rupture timing of the fragile portions 10a and 20a of the airbag 1 is unlikely to fluctuate depending on the configuration and layout of the inflator 3. The airbag device S provided with the airbag 1 exhibits higher degree of freedom for selection and layout of the inflator 3.

In the embodiment, each of the openings 11 and 21 constituting the fragile portions 10a and 20a is sufficiently spaced apart from each front end of the regulation members 10 and 20, respectively. Those fragile portions 10a and 20a become further insusceptible to the influence of heat of the gas blown from the inflator 3.

In the embodiment, the second half panels 13 and 23 of the regulation members 10 and 20 for forming the front ends of the airbag 1 have weaving directions of the respective woven cloths in substantially parallel with and orthogonal to the tensile direction T of the respective regulation members 10 and 20. The high rupture strength allows the respective regulation members 10 and 20 to be strongly joined with the front end of the airbag 1.

In the embodiment, the seam 14 for joining the first half panel 12 and the second half panel 13 of the upper regulation member 10 is covered with the fireproof cloth 1f to prevent the seam 14 from being ruptured by heat from the inflator 3.

Figure 24:
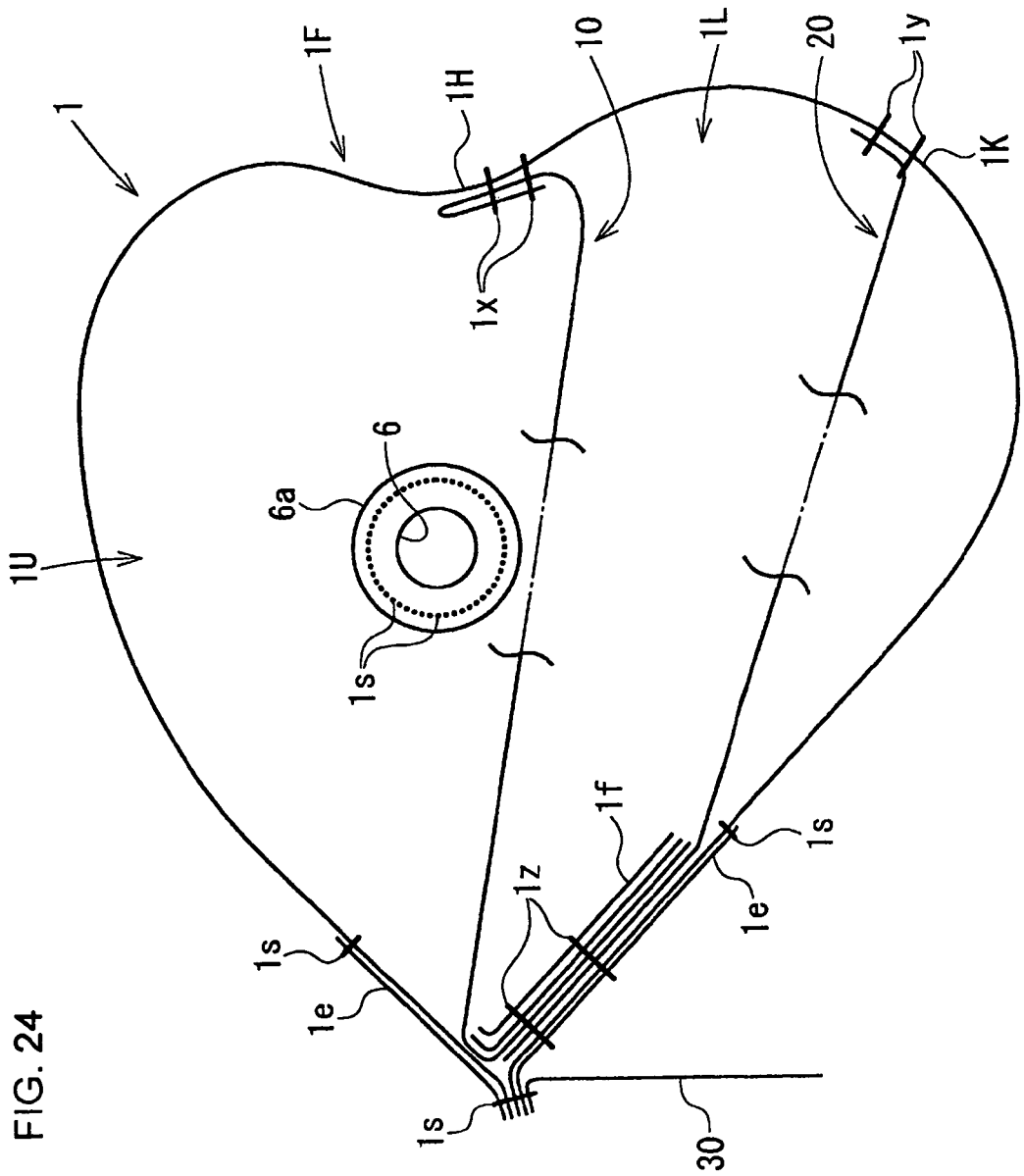
FIG. 24 is a longitudinal sectional view of the airbag according to another embodiment.

In the embodiment shown in FIGS. 1 to 23, the front end of the upper regulation member 10 is connected to the lower surface of the airbag 1 at the side closer to the rear of the vehicle than the inflator 3. In the present invention, the front end of the upper regulation member 10 may be connected to the lower surface of the airbag 1 at the side closer to the front of the vehicle than the inflator 3. FIG. 24 is a longitudinal sectional view of the thus structured airbag.

In the embodiment, the upper regulation member 10 is connected to the front end of the airbag 1 by folding back the front end of the upper regulation member 10 by a predetermined length on the lower surface, and sewing the folded back portion to the lower surface of the front end of the airbag 1 with the seam 1z while directing the fold line to the front of the vehicle. The fix plate 7 is layered on the sewn portion at the front end of the upper regulation member 10 via the fireproof cloth 1f, and the inflator 3 is held by the fix plate 7. The upper regulation member 10 is drawn to the front edge of the fix plate 7 to extend to the rear of the vehicle body above the inflator 3. As a result, the upper regulation member 10 has the front end connected to the lower surface of the airbag 1 at a side closer to the front of the vehicle than the inflator 3. The inflator 3 is disposed inside the lower chamber 1L below the upper regulation member 10.

Other structures of the embodiment are the same as those shown in FIGS. 1 to 23. Referring to FIG. 24, the same codes as those shown in FIGS. 1 to 23 represent the same portions.

In the embodiment, the inflator 3 is disposed inside the lower chamber 1L of the airbag. Being blown from the inflator 3, the gas flows into the lower chamber 1L. So the lower side of the airbag 1 will inflate and deploy quickly upon inflation of the airbag.

The aforementioned embodiment is a mere example of the present invention. It is to be understood that the present invention is not limited to the aforementioned embodiments.

The aforementioned embodiment includes the lower regulation member 20 formed by connecting the lower portion 1K of the occupant counter surface 1F to the front end of the airbag 1 in addition to the upper regulation member 10 formed by connecting the recess portion 1H of the occupant counter surface 1F, which confronts the small-sized occupant head upon inflation of the airbag 1 to the front end of the airbag 1. However, the number and arrangement of the regulation members to be provided for the airbag 1 are not limited.

In the embodiment, the upper regulation member 10 is connected to the deepest portion of the recess portion 1H. However, the position at which the upper regulation member 10 is connected to the occupant counter surface 1F is not limited to the one as described above. The upper regulation member 10 may be connected to the occupant counter surface 1F at the portion other than the deepest portion of the recess portion 1H (for example, the portion above the deepest portion of the recess portion 1H). The deepest portion of the recess portion 1H may be displaced from the position expected to confront the small-sized occupant head upon inflation of the airbag 1 (for example, lower side).

In the embodiment, the respective regulation members 10 and 20 are formed by connecting the first half panels 12 and 22 at the side of the occupant counter surface 1F to the second half panels 13 and 23 at the front end of the airbag 1. The structures of the regulation members 10 and 20 are not limited to those described above. For example, each of the regulation members 10 and 20 may be formed of the single woven cloth which is continuous from each one end to the other end. Alternatively, 3 or more half panels may be joined.

The disclosure of Japanese Patent Application No. 2008-327977 filed on Dec. 24, 2008 is incorporated as a reference.

While the invention has been explained with reference to the specific embodiments of the invention, the explanation is illustrative and the invention is limited only by the appended claims.

What is claimed is:

1. An airbag for protecting an occupant comprising:
a panel forming the airbag and having an occupant counter surface with a head counter portion to face a head of the occupant when the airbag is inflated, a recess portion formed in the head counter portion when the airbag is inflated, a regulation member for regulating inflation of the head counter portion toward the occupant, said regulation member forming the recess portion by regulating inflation of the head counter portion toward the occupant upon inflation of the airbag, and
a sub-regulation member for connecting a lower portion of the occupant counter surface which is located below the recess portion upon inflation of the airbag, and shorter in length than the regulation member,
wherein the regulation member and the sub-regulation member are formed of tether, the regulation member includes a structure to release regulation after a predetermined time from a moment when the airbag starts inflation, and the sub-regulation member ruptures before releasing the regulation of the regulation member upon inflation of the airbag, and the head counter portion of the airbag inflates earlier than the lower portion.

2. The airbag according to claim 1, wherein the predetermined time is in a range from 15 to 40 msec from the moment when the airbag starts inflation.

3. The airbag according to claim 1, wherein:

the regulation member is disposed inside the panel of the airbag, and connects the head counter portion to a side of the panel opposite the occupant; and the regulation member is configured to rupture by a tensile force applied to the regulation member after the predetermined time from the moment when the airbag starts inflation to release connection between the head counter portion and the side opposite the occupant.

4. The airbag according to claim 3, wherein the regulation member includes a fragile portion so as to be ruptured upon application of the tensile force to the regulation member, and the fragile portion is spaced from an end of the regulation member at a side opposite the occupant by 210 to 240 mm upon the inflation of the airbag.

5. The airbag according to claim 4, wherein the regulation member includes an opening, and a circumferential edge of the opening serves as the fragile portion.

6. The airbag according to claim 4, wherein the regulation member is formed of a woven cloth having a weaving structure obliquely crossing with respect to a tensile direction at least in the fragile portion of the regulation member.

7. The airbag according to claim 6, wherein said end of the regulation member and a surrounding portion of the regulation member have a weaving direction of the woven cloth substantially parallel with the tensile direction.

8. The airbag according to claim 1, wherein the sub-regulation member is configured to be ruptured after an elapse of 10 to 30 msec from the moment when the airbag starts inflating.

9. The airbag according to claim 1, wherein:

the sub-regulation member includes a fragile portion ruptured by tensile force applied to the sub-regulation member before releasing regulation of the regulation member from the moment when the airbag starts inflating; and the fragile portion of the sub-regulation member is spaced from an end of the sub-regulation member at the side opposite the occupant upon inflation of the airbag in a range from 190 to 220 mm.

10. The airbag according to claim 9, wherein the sub-regulation member includes an opening, and a circumferential edge portion of the opening is formed as the fragile portion.

11. The airbag according to claim 9, wherein the sub-regulation member is formed of a woven cloth having a weaving structure obliquely crossing with respect to a tensile direction at least in the fragile portion of the sub-regulation member.

12. The airbag according to claim 11, wherein the sub-regulation member includes an end and a surrounding area thereof at the side opposite the occupant upon inflation of the airbag, the end and the surrounding area having at least a weaving direction of the woven cloth substantially parallel with the tensile direction.

13. An airbag device comprising the airbag according to claim 1, and an inflator for inflating the airbag.

14. An airbag according to claim 1, wherein the regulation member is connected to a front end portion opposite to the occupant counter face of the airbag and having a folded back portion folding back a front end of the regulation member by a predetermined length, to a lower surface of the front end portion when the airbag is folded, a fold line of the folded back portion facing a front of a vehicle.

15. An airbag according to claim 1, wherein the regulation member includes a first half panel having one end joined with the recess portion of the occupant counter surface and a second half panel having one end joined with a front end portion opposite to the occupant counter surface of the airbag, the other ends of the first half panel and the second half panel are joined together, and the second half panel has a higher rupture strength than the first half panel.

16. An airbag according to claim 1, wherein the sub-regulation member includes a first half panel having one end joined with the lower portion of the occupant counter surface, and a second half panel having one end joined with a front end portion opposite to the occupant counter surface of the airbag, the other ends of the first half panel and the second half panel are joined together, and the second half panel has a higher rupture strength than the first half panel.

17. An airbag according to claim 1, further comprising a front end portion opposite to the occupant counter surface; and a reinforcing cloth attached to a surface of the panel at the front end of portion of the airbag.

* * * * *